(12) United States Patent
Frey

(10) Patent No.: US 11,112,523 B2
(45) Date of Patent: Sep. 7, 2021

(54) CALIBRATION OF ELECTROMAGNETIC MEASUREMENT TOOL

(71) Applicant: Schlumberger Technology Corporation, Sugar Land, TX (US)

(72) Inventor: Mark Frey, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 340 days.

(21) Appl. No.: 16/207,234

(22) Filed: Dec. 3, 2018

(65) Prior Publication Data

US 2019/0137646 A1  May 9, 2019

Related U.S. Application Data

(60) Provisional application No. 62/593,321, filed on Dec. 1, 2017.

(51) Int. Cl.
| | |
|---|---|
| *G01V 3/26* | (2006.01) |
| *G01V 3/12* | (2006.01) |
| *G01N 29/32* | (2006.01) |
| *G01V 13/00* | (2006.01) |
| *G01V 3/30* | (2006.01) |
| *G01V 3/08* | (2006.01) |

(52) U.S. Cl.
CPC .............. *G01V 3/26* (2013.01); *G01N 29/326* (2013.01); *G01V 3/12* (2013.01); *G01V 3/30* (2013.01); *G01V 13/00* (2013.01); *G01V 2003/085* (2013.01)

(58) Field of Classification Search
CPC ......... G06N 3/00; H04L 1/00; H04L 2201/00; G06K 1/00; G06K 2207/00; G01B 1/00
See application file for complete search history.

(56) References Cited

U.S. PATENT DOCUMENTS

| | | | |
|---|---|---|---|
| 4,439,831 | A | 3/1984 | Sinclair |
| 4,876,511 | A | 10/1989 | Clark |
| 5,293,128 | A | 3/1994 | Zhou |
| 6,353,322 | B1 | 3/2002 | Tabarovsky et al. |
| 6,534,985 | B2 | 3/2003 | Holladay, III et al. |
| 7,141,981 | B2 | 11/2006 | Folberth et al. |
| 7,915,895 | B2 | 3/2011 | Chemali et al. |
| 8,301,384 | B2 | 10/2012 | Forgang et al. |

(Continued)

FOREIGN PATENT DOCUMENTS

EP    2815070 A1    12/2014

*Primary Examiner* — Jermele M Hollington
*Assistant Examiner* — Temilad S Rhodes-Vivour

(57) ABSTRACT

A calibration method includes determining calibration standards for a reference tool including a reference transmitter and a reference receiver. First and second calibration factors are measured to match a receiver on an electromagnetic measurement tool (the tool to be calibrated) to the reference receiver and to match a transmitter on the electromagnetic measurement tool to the reference transmitter. The electromagnetic measurement tool is deployed in a subterranean wellbore and used to make electromagnetic measurements therein. The measured first and second calibration factors and at least one of the calibration standards are applied to at least one of the electromagnetic measurements to compute a gain calibrated electromagnetic measurement.

20 Claims, 8 Drawing Sheets

(56) References Cited

U.S. PATENT DOCUMENTS

| | | | |
|---|---|---|---|
| 8,378,684 B2 * | 2/2013 | Minh | G01V 3/28 |
| | | | 324/339 |
| 8,466,683 B2 | 6/2013 | Legendre et al. | |
| 8,736,270 B2 * | 5/2014 | Seydoux | G01V 3/28 |
| | | | 324/338 |
| 2004/0113609 A1 | 6/2004 | Homan et al. | |
| 2005/0143920 A1 | 6/2005 | Barber et al. | |
| 2006/0132138 A1 | 6/2006 | Pelegri et al. | |
| 2006/0208737 A1 | 9/2006 | Merchant et al. | |
| 2008/0246485 A1 | 10/2008 | Hibbs et al. | |
| 2009/0302851 A1 | 12/2009 | Bittar et al. | |
| 2011/0074427 A1 | 3/2011 | Wang et al. | |
| 2011/0133740 A1 | 6/2011 | Seydoux et al. | |
| 2011/0238312 A1 | 9/2011 | Seydoux et al. | |
| 2012/0078558 A1 | 3/2012 | Pelegri et al. | |
| 2013/0035862 A1 | 2/2013 | Fang et al. | |
| 2013/0043884 A1 | 2/2013 | Le et al. | |
| 2013/0154846 A1 * | 6/2013 | Mangione | G01S 13/885 |
| | | | 340/854.6 |
| 2013/0191028 A1 | 7/2013 | Homan et al. | |
| 2013/0301388 A1 | 11/2013 | Hartmann et al. | |
| 2013/0311094 A1 * | 11/2013 | Donderici | G01V 3/30 |
| | | | 702/7 |
| 2014/0015530 A1 * | 1/2014 | Miles | E21B 15/00 |
| | | | 324/339 |
| 2014/0368200 A1 | 12/2014 | Wang et al. | |
| 2015/0083500 A1 * | 3/2015 | Vail, III | F04C 13/008 |
| | | | 175/107 |
| 2015/0177412 A1 | 6/2015 | San Martin et al. | |
| 2015/0276968 A1 | 10/2015 | Frey | |
| 2016/0116627 A1 | 4/2016 | Frey | |
| 2016/0170068 A1 | 6/2016 | Donderici | |

* cited by examiner

CALIBRATION OF ELECTROMAGNETIC MEASUREMENT TOOL

CROSS REFERENCE TO RELATED APPLICATIONS

This application claims the benefit of U.S. Provisional Application Ser. No. 62/593,321 entitled Gain Calibration of Electromagnetic Measurements, filed Dec. 1, 2017.

FIELD OF THE INVENTION

Disclosed embodiments relate generally to electromagnetic logging measurements and more particularly to a method for gain calibration of electromagnetic measurements, for example, employing rotating or non-rotating measurement subs including triaxial and/or tilted antenna.

BACKGROUND INFORMATION

The use of electromagnetic measurements in prior art downhole applications, such as logging while drilling (LWD) and wireline logging applications, may be utilized to determine a subterranean formation resistivity, which, along with formation porosity measurements, can be used to indicate the presence of hydrocarbons in the formation. Moreover, azimuthally sensitive directional resistivity measurements may be employed e.g., in pay-zone steering applications, to provide information upon which steering decisions may be made.

Tool and/or measurement calibration methods may be used to improve accuracy in electromagnetic logging operations. Factors such as imperfections in tool construction and gain variations due to tool electronics may introduce significant measurement errors. The intent of tool calibration is to eliminate and/or compensate for the effects of these factors on the measurement data. Air calibration methods may be employed in which an electromagnetic resistivity tool is lifted in air away from any conducting media (e.g. via a crane). A resistivity measurement should yield near-infinite resistivity (i.e., a conductivity of zero). Any deviation is subtracted and is assumed to be related to systematic measurement errors (e.g., related to the electronics, hardware, or processing methods).

While the aforementioned calibration methods may provide an adequate calibration for conventional electromagnetic logging tools, they can be difficult to implement with deep reading, directional electromagnetic resistivity tools (look-around tools) or electromagnetic look-ahead tools. As described in more detail below, the transmitter and receiver subs in such deep reading tools may be modular such that neither the axial spacing nor the azimuthal alignment angle between the subs are fixed. Hence a calibration performed for one tool configuration will not necessarily be valid for any other tool configuration. Moreover, performing a conventional air calibration tends to be difficult if not impossible to implement at a drilling site owing to the long spacing between transmitter and receiver subs (e.g., up to 100 feet or more) and the need to suspend the entire bottom hole assembly (BHA).

During an electromagnetic look-ahead measurement only a small amount of the tool response comes from ahead of the bit. Isolating that response may involve subtracting the much larger response from behind. Therefore, there remains a need in the art for improved methods for calibrating directional resistivity logging tools, particularly deep reading tools.

SUMMARY

A method for calibrating an electromagnetic logging tool is disclosed. The method includes providing an electromagnetic measurement tool including a transmitter and a receiver and a reference tool including a reference transmitter and a reference receiver. The measurement tool may be a deep reading measurement tool, for example, such that the transmitter and receiver may be deployed on distinct transmitter and receiver subs. Calibration standards are determined for the reference tool and first and second calibration factors are measured to match the receiver on the electromagnetic measurement tool to the reference receiver on the reference tool and to match the transmitter on the electromagnetic measurement tool to the reference transmitter on the reference tool. The electromagnetic measurement tool is deployed in a subterranean wellbore and used to make electromagnetic measurements in the wellbore. The first and second measured calibration factors and the determined calibration standard are applied to at least one of the electromagnetic measurements to compute a gain calibrated electromagnetic measurement.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

A disclosed calibration method comprises determining calibration standards for a reference tool including a reference transmitter and a reference receiver. First and second calibration factors are measured to match a receiver on an electromagnetic measurement tool (the tool to be calibrated) to the reference receiver on the reference tool and to match a transmitter on the electromagnetic measurement tool to the reference transmitter on the reference tool. The electromagnetic measurement tool is deployed in a subterranean wellbore and used to make electromagnetic measurements in the wellbore. The first and second measured calibration factors and the calibration standard are applied to at least one of the electromagnetic measurements to compute a gain calibrated electromagnetic measurement.

Disclosed embodiments advantageously enable full gain calibration of axial, transverse, tilted, and/or triaxial antenna electromagnetic measurements without the use of an electromagnetic coupling model. In particular, the method does not make use of a model of the transmitter and receiver coupling so long as the electrical properties (e.g., conductivity) of the coupling is stable and repeatable. The method computes a gain ratio for each coupling that cancels the transmitter and receiver gains that are present in the downhole measurements.

Figure 1:
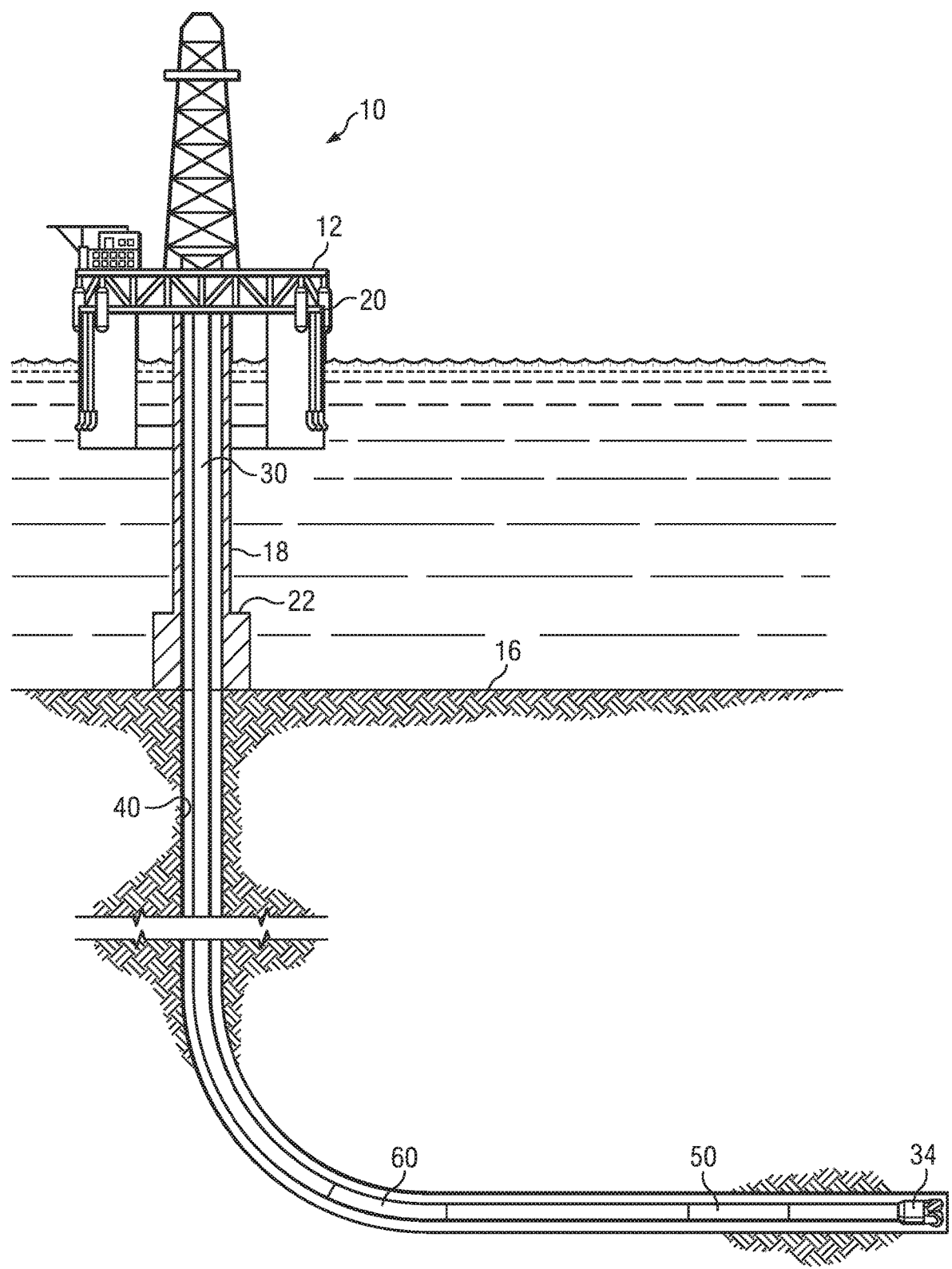
FIG. 1 depicts an example drilling rig on which disclosed embodiments may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes a deep reading electromagnetic measurement tool including distinct transmitter 50 and receiver 60 subs configured to make tri-axial electromagnetic logging measurements.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations. Moreover, disclosed embodiments are not limited to logging while drilling embodiments as illustrated on FIG. 1. The disclosed embodiments are equally well suited for use with any electromagnetic logging tool, including wireline logging tools and logging while drilling tools, used while rotating or non-rotating.

Figure 2:
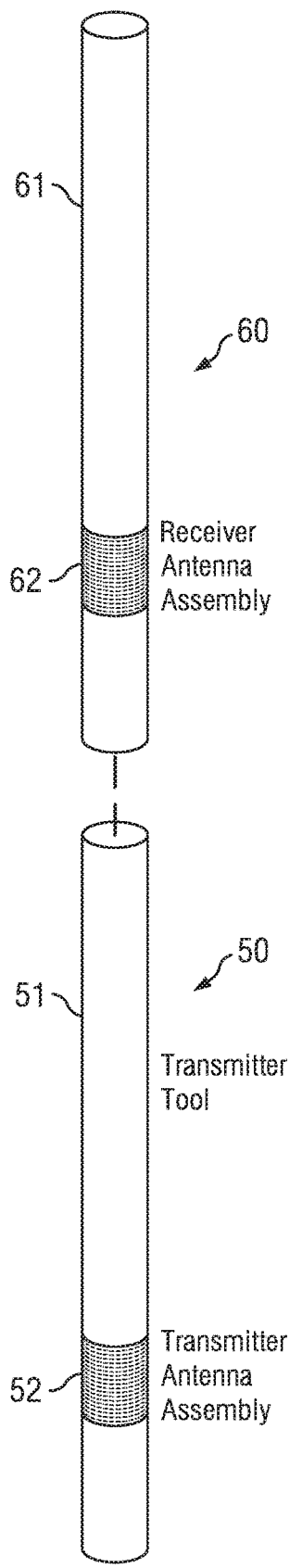
FIG. 2 depicts one example of a deep reading electromagnetic logging tool including first and second transmitter and receiver subs.

FIG. 2 depicts one example embodiment of the electromagnetic measurement tool shown on FIG. 1 (including transmitter and receiver subs 50 and 60). In the depicted embodiment, the transmitter sub (or tool) 50 includes an electromagnetic transmitter 52 deployed on a transmitter collar 51. The receiver sub (or tool) 60 includes an electromagnetic receiver 62 deployed on a receiver collar 61. When deployed in a drill string (e.g., drill string 30 on FIG. 1), the transmitter and receiver subs 50 and 60 may be axially spaced apart substantially any suitable distance to achieve a desired measurement depth (e.g., in a range from about 20 to about 100 or 200 feet or more depending on the measurement objectives). While not shown, one or more other BHA tools may be deployed between subs 50 and 60. As described in more detail below the transmitter 52 and receiver 62 may each include three tri-axial antennas (e.g., an axial antenna and first and second transverse antennas that are orthogonal to one another in this particular embodiment). As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

Figure 3:
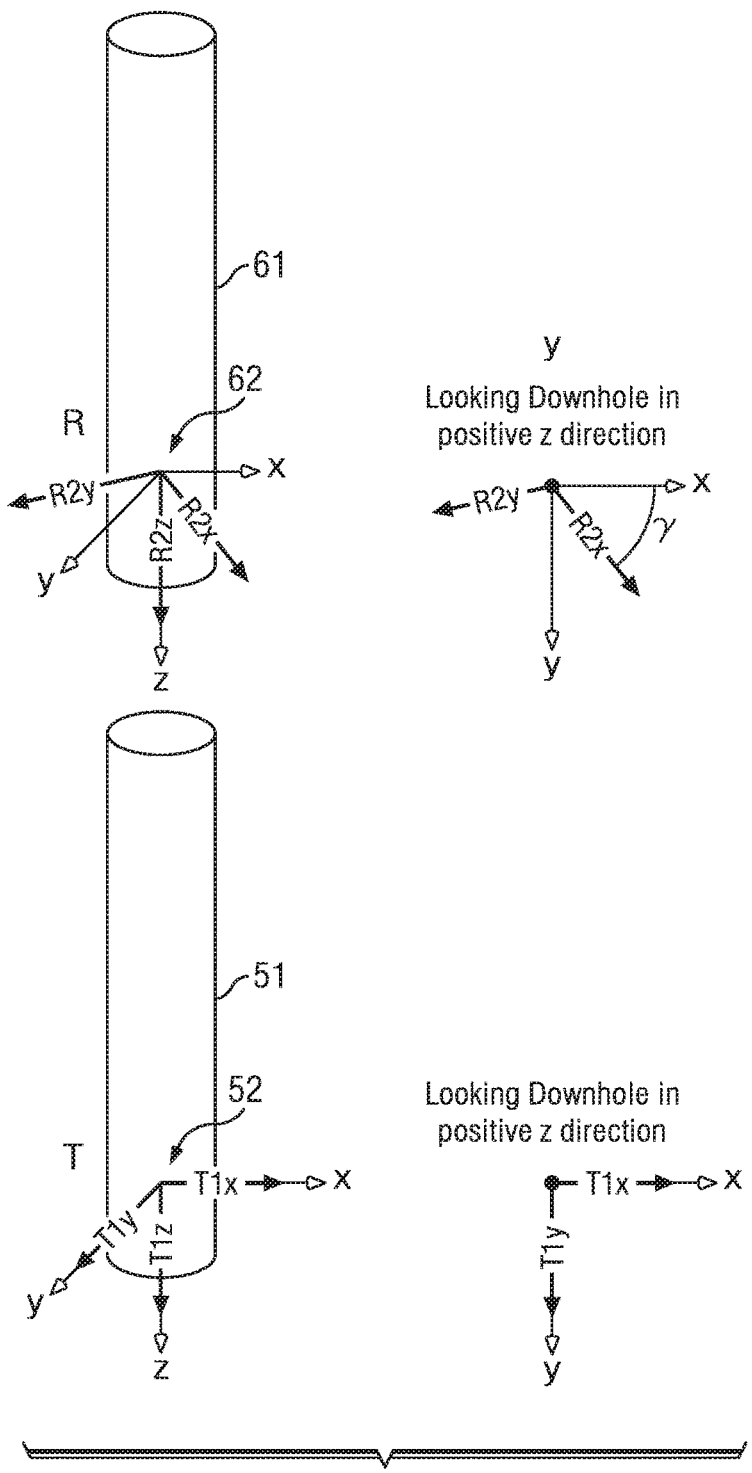
FIG. 3 schematically depicts a deep reading electromagnetic logging tool including collocated triaxial transmitters and receivers.

FIG. 3 depicts the antenna moments for an example transmitter 52 and receiver 62. The transmitter 52 includes three collocated tri-axial antennas having mutually orthogonal moments $T1x$, $T1y$, and $T1z$ aligned with the x-, y-, and z-directions. Receiver 62 also includes three collocated tri-axial antennas having mutually orthogonal moments $R1x$, $R1y$, and $R1z$. In the depicted embodiment in which there is no bending of the drill string (or BHA), moment $R1z$ is aligned with $T1z$ (and the z-azis) while moments $R1x$ and $R1y$ are rotationally offset from $T1x$ and $T1y$ by an arbitrary offset angle $\gamma$. As depicted, the receiver sub 60 is rotationally offset (about the axis of the drill string, the z-axis) with respect to transmitter sub 50 the arbitrary misalignment angle $\gamma$. It will also be understood that the misalignment angle $\gamma$ is the result of a rotational misalignment between subs 50 and 60 during make-up of the drill string and that the misalignment angle $\gamma$ may therefore have substantially any value.

While not depicted, it will be understood that the disclosed embodiments are applicable to electromagnetic measurements made when BHA bending is negligible or when BHA bending is non-negligible. Bending may be negligible, for example, in vertical or horizontal drilling applications and may be non-negligible, for example, while building inclination prior to landing in a zone or bed of interest. Much of the discussion that follows assumes that bending is negligible. These assumptions are for convenience and ease of illustration only. The disclosed embodiments are explicitly not limited in these regards and may be used when bending is negligible or non-negligible.

As depicted in FIG. 3 and according to the described embodiments below, the terms "transmitter" and "receiver" are used to describe different functions of an antenna, as if they were different types of antennas. It will be understood that this is only for illustration purposes. A transmitting antenna and a receiving antenna may have the same physical characteristics, and one of ordinary skill in the art would appreciate that the principle of reciprocity applies and that a radiating element may be used as a transmitter at one time and as a receiver at another. Thus, any specific description of transmitters and receivers in a particular tool embodiment should be construed to include the complementary configuration, in which the "transmitters" and the "receivers" are switched. Furthermore, in this description, a "transmitter" or a "receiver" is used in a general sense and may include a single radiating element, two radiating elements, or three or more radiating elements.

It will be further understood that during electromagnetic measurements, a transmitting antenna and a receiving antenna are electromagnetically coupled to one another. For example, the transmitting antenna may be energized (e.g., with an alternating current) and an induced voltage may be measured on the receiving antenna. Based on reciprocity, the receiving antenna may be equivalently energized and an induced voltage may be measured on the transmitting antenna. The disclosed embodiments are explicitly not limited in these regards.

The use of electromagnetic measurements (e.g., propagation and induction measurements) is known in the downhole drilling arts. In such measurements, transmitting and receiving antennas are electromagnetically coupled via applying a time varying electric current (an alternating current) in a transmitting antenna that produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennas can be processed, as is known to those of ordinary skill in the art, to obtain one or more properties of the formation. Electromagnetic measurements may make use of substantially any suitable antenna configuration, for example, one or more axial, transverse, tilted, biaxial, and/or triaxial antenna arrangements as described above and in commonly assigned and commonly invented U.S. Patent Publications 2015/0276968 and 2016/0116627, each of which is incorporated by reference herein in its entirety.

Basic Measurement Assumptions

According to Faraday's Law, the voltage induced V induced in a coil by a magnetic field oscillating at frequency co is proportional to the magnetic flux, F through the area bounded by the coil, $$V_{induced} = -\frac{d}{dt}F = -j\omega F \qquad \text{EQUATION 1}$$

If the magnetic field is constant in magnitude and direction over the area of each of the loops of the coil, then the flux is proportional to the number of receiver turns times the loop-area, $A_R$ $$F = \int \vec{B} \cdot d\vec{a} = B_R \sum_{i=1}^{N_R} A_R = B_R N_R A_R \qquad \text{EQUATION 2}$$

where $B_R$ is the magnetic field component over the loop normal to the loop-area and $N_R$ is the number of receiver coil turns. The magnitude and direction of the magnetic field at the receiver generated by a transmitter coil depends on the magnitude and frequency of the driving current, I, the spacing between the coils, and on the electrical properties of the material between the transmitter (represented as an impedance Z in Equation 3). If the field generated by each of the loops in the transmitter coil is nearly the same in magnitude and direction, then the magnetic field from the transmitter scales as the number of transmitter turns $N_T$ and the transmitter loop area $A_T$. With these assumptions, the induced voltage is written as follows:

$$V_{induced} \propto N_T A_T N_R A_R Z I \qquad \text{EQUATION 3}$$

The actual voltage measured V is also proportional to the electronic gain and phase of the transmitter and receiver antennas and electronics. If the transmitter current and the turn-area of the transmitter is lumped together with the transmitter electronics gain into a total transmitter gain $g_T$ and the receiver turn-area is lumped together with the receiver electronics gain into a total receiver gain $g_R$, then the measured voltage can be modeled as being proportional to a formation impedance Z that depends only on the frequency, the electrical properties of the medium between the transmitter and receiver, and on the geometry (for example spacing and orientation) of the antennas as follows:

$$V = g_T g_R Z \qquad \text{EQUATION 4}$$

In addition to the mutual inductive coupling between the transmitter and receiver antennas (coils), other signal sources and other sources of coupling can also generate signals in the receiver system. Noise is a non-coherent signal due to intrinsic noise in the antenna or electronics. Interference is a non-coherent signal on the receiver from sources either inside (power supply switching for example), or outside the tool (power line harmonics, radio broadcasts, lighting, etc.). Coherent sources of coupling also generally occur at some level since it is never possible to perfectly isolate the transmitter and receiver electronics. Imperfections in the transmitter may induce a current that flows down the collar and that couples to imperfections in the receiver (which is referred to as TM mode coupling). Similarly, the transmitter and receiver may couple capacitively. Crosstalk is a voltage in the receiver that arises from coupling between the transmitter and the receiver inside the tool. Crosstalk is coherent with the mutual antenna coupling. The voltage measured at the receiver is the sum of all of the above sources as follows:

$$V_{total} = V + V_{TM} + V_{cap} + V_{crosstalk} + V_{noise} \qquad \text{EQUATION 5}$$

The following assumptions are made in the disclosed calibration methods that follow:

(i) The magnetic field produced by the transmitter coil is approximately constant in magnitude and direction across the receiver coil.

(ii) transverse magnetic (TM) mode coupling, capacitive coupling, crosstalk, interference, and (averaged) noise voltages are small compared to the transverse electric (TE) mode signals induced in the receivers by the electromagnetic measurement (i.e., by design).

(iii) The gains (electronic and antenna) are linear over the measurement range.

(iv) A tool-formation response model exists that can match the calibrated tool measurements with sufficient accuracy to invert the calibrated measurements for the formation properties of interest.

Collocated Orthogonal Triaxial Measurements

The current flow $\vec{J}$ due to an electric field $\vec{E}$ applied to a material with conductivity a is not necessarily in the same direction as the applied electric field as follows:

$$\vec{J} = \sigma \vec{E}$$

$$J_x = \sigma_{xx}E_x + \sigma_{xy}E_y + \sigma_{xz}E_z$$

$$J_y = \sigma_{yx}E_x + \sigma_{yy}E_y + \sigma_{yz}E_z$$

$$J_z = \sigma_{zx}E_x + \sigma_{zy}E_y + \sigma_{zz}E_z \qquad \text{EQUATION 6}$$

In general the earth is anisotropic and its electrical properties are a tensor which contains information on formation resistivity anisotropy, dip, bed boundaries and other aspects of formation geometry.

$$\sigma = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix} \quad \text{EQUATION 7}$$

Traditional propagation and induction measurements utilizing only axial (z-axis) coils are only sensitive to a fraction of the full conductivity tensor. The mutual inductive couplings between 3 mutually orthogonal collocated transmitter coils and 3 mutually orthogonal collocated receiver coils form a tensor and have sensitivity to the full conductivity tensor (including the nine tensor elements shown in Equation 7). In principle, measurements of these fundamental triaxial couplings can be inferred from this triaxial measurement and can be written compactly in matrix form as follows:

$$V_{induced} \stackrel{m}{=} IZ = \begin{bmatrix} I_x & 0 & 0 \\ 0 & I_y & 0 \\ 0 & 0 & I_z \end{bmatrix} \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \quad \text{EQUATION 8}$$

Wherein the $\stackrel{m}{=}$ symbol is used throughout to denote when a measurement is 'modeled as'. The first letter (indice) in the subscript in the Z tensor corresponds to the direction of the transmitter (x-, y-, or z-axes) while the second corresponds to the direction of the receiver. For example, $Z_{xx}$ represents the mutual coupling between the x-axis transmitter firing with current $I_x$ (whose moment is aligned with the x-axis) and the receiver whose moment is also aligned with the x-axis, $Z_{yx}$ represents the mutual coupling between the y-axis transmitter firing with current $I_y$ (whose moment is aligned with the y-axis) and the receiver whose moment is aligned with the y-axis, and so on. As before, the actual voltage measured depends on the electronic and antenna gains. For the triaxial case this can be represented in matrix form as follows:

$$V = \begin{bmatrix} V_{xx} & V_{xy} & V_{xz} \\ V_{yx} & V_{yy} & V_{yz} \\ V_{zx} & V_{zy} & V_{zz} \end{bmatrix} \stackrel{m}{=} G_T Z G_R = \begin{bmatrix} g_{Tx} & 0 & 0 \\ 0 & g_{Ty} & 0 \\ 0 & 0 & g_{Tz} \end{bmatrix} \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} g_{Rx} & 0 & 0 \\ 0 & g_{Ry} & 0 \\ 0 & 0 & g_{Rz} \end{bmatrix} \quad \text{EQUATION 9}$$

Here as before, the transmitter currents are included in the generalized transmitter electronic gains $G_T$. If the magnetic field produced by the transmitter coil is approximately constant in magnitude and direction across the receiver coil, then the mutual inductive coupling scales with the number of turns and the effective coil areas of the transmitter and receiver. As described above, the turn areas can simply be folded into the gains (as in Equation 4). However, in general the antenna moments do not have to be aligned with the x-, y-, and z-tool axes. The moment may then be expressed as a generalized gain times a unit vector that points in the direction normal to the area enclosed by the antenna coil as follows:

EQUATION 10

$$V \stackrel{m}{=} \begin{bmatrix} g_{Tx} & 0 & 0 \\ 0 & g_{Ty} & 0 \\ 0 & 0 & g_{Tz} \end{bmatrix} \begin{bmatrix} m_{Txx} & m_{Txy} & m_{Txz} \\ m_{Tyx} & m_{Tyy} & m_{Tyz} \\ m_{Tzx} & m_{Tzy} & m_{Tzz} \end{bmatrix}^t Z \begin{bmatrix} m_{Rxx} & m_{Rxy} & m_{Rxz} \\ m_{Ryx} & m_{Ryy} & m_{Ryz} \\ m_{Rzx} & m_{Rzy} & m_{Rzz} \end{bmatrix} \begin{bmatrix} g_{Rx} & 0 & 0 \\ 0 & g_{Ry} & 0 \\ 0 & 0 & g_{Rz} \end{bmatrix}$$

where the superscript t represents the transpose of the corresponding matrix, and where $m_{Txx}$, $m_{Tyx}$, and $m_{Tzx}$ represent the projection of a unit vector that is in the same direction as the 'x' transmitter moment on the x-, y-, and z-tool axes respectively, $m_{Txy}$, $m_{Tyy}$, and $m_{Tzy}$ represent the projection of a unit vector that is in the same direction as the 'y' transmitter moment on the x-, y-, and z-tool axes respectively, and $m_{Txz}$, $m_{Tyz}$, and $m_{Tzz}$ represent the projection of a unit vector that is in the same direction as the 'z' transmitter moment on the x-, y-, and z-tool axes respectively. Likewise, $m_{Rxx}$, $m_{Ryx}$, and $m_{Rzx}$ represent the projection of a unit vector that is in the same direction as the 'x' receiver moment on the x-, y-, and z-tool axes respectively, $m_{Rxy}$, $T_{Ryy}$, and $m_{Rzy}$ represent the projection of a unit vector that is in the same direction as the 'y' receiver moment on the x-, y-, and z-tool axes respectively; and $m_{Rxz}$, $m_{Ryz}$, and $m_{Rzz}$ represent the projection of a unit vector that is in the same direction as the 'z' receiver moment on the x-, y-, and z-tool axes. Note that the subscripts of each tensor element do not necessarily refer to specific directions, but now simply serve to label them. For example the voltage $V_{xy}$ is the voltage measured on the receiver coil labeled 'y' that is not necessarily in the y direction when the transmitter labeled as the 'x' transmitter that is not necessarily aligned with the x direction fires.

For a rotating tool, the transmitter (receiver) moment is rotated around the tool axis at the local transmitter (receiver) tool axis direction, which in general are not the same because of bending of the BHA such that:

$$m_{T\_rotated} = R_T \begin{bmatrix} m_{Txx} & m_{Txy} & m_{Txz} \\ m_{Tyx} & m_{Tyy} & m_{Tyz} \\ m_{Tzx} & m_{Tzy} & m_{Tzz} \end{bmatrix} = R_T m_T \qquad \text{EQUATION 11}$$

$$m_{R\_rotated} = R_R \begin{bmatrix} m_{Rxx} & m_{Rxy} & m_{Rxz} \\ m_{Ryx} & m_{Ryy} & m_{Ryz} \\ m_{Rzx} & m_{Rzy} & m_{Rzz} \end{bmatrix} = R_R m_R$$

where $R_T$ and $R_R$ represent the rotation matrices of the transmitter and receiver, where the angles T and R are defined with respect to a general reference system (e.g., with respect to a tool, wellbore, or Earth's reference frame).

For the case of an electromagnetic logging arrangement employing a triaxial transmitter and a triaxial receiver, the moment matrices are equal to the identity matrix:

$$m_T = m_R = \begin{bmatrix} 1 & 0 & 0 \\ 0 & 1 & 0 \\ 0 & 0 & 1 \end{bmatrix}$$

Including rotation, the measured voltage may be modeled as follows:

$$V = G_T m_T^t R_T^t Z R_R m_R G_R \qquad \text{EQUATION 12}$$

By way of review, Equation 12 assumes the following:

(i) TM mode coupling, capacitive coupling, crosstalk, interference, and (averaged) noise voltages are small compared to the signals induced in the receivers through magnetic coupling through the formation (ii) The three antennas in each transmitter and receiver triad are substantially collocated and orthogonal to each other.

(iii) The magnetic fields are approximately constant over both the transmitter and receiver coils such that each can be scaled by a single gain value.

(iv) The system is linear as the signal level changes, that is the gain does not change with signal level.

(v) There is no electronic cross-coupling between each of the transmitter and each of receiver channels such that the gain of each triad can be represented by a diagonal matrix.

The cross axial antenna (i.e., the x- and y-axis antennas) are generally misaligned in a deep measurement system including distinct transmitter and receiver subs that are threadably connected to a BHA. The misalignment is arbitrary (depending on the orientation of the tool threads and the make-up torque employed in the particular operation) such that the cross-axial transmitter and receiver antennas may be thought of as having an arbitrary alignment angle $\gamma$ between them. The angle $\gamma$ can be measured upon tool make-up and is therefore assumed to be known such that Equation 12 can be rewritten as follows:

$$V \stackrel{m}{=} G_T m_T^t (R_T^t Z R_R) R_\gamma m_R G_R \qquad \text{EQUATION 13}$$

As noted above, $G_T$ and $G_R$ represent the transmitter and receiver gains. For a triaxial transmitter, the gains may be modeled as the product of an antenna gain (effective turn area, $gm_{Tx}$, $gm_{Ty}$, and $gm_{Tz}$) and the corresponding transmitter currents ($I_{Tx}$, $I_{Ty}$, and $I_{Tz}$). For triaxial receivers, the gains may be modeled as the product of an antenna gain (effective turn area, $gm_{Rx}$, $gm_{Ry}$, and $gm_{Rz}$) and the gain of the receiver electronics ($ge_{Rx}$, $ge_{Ry}$, and $ge_{Rz}$), for example, as follows:

$$G_T = \begin{bmatrix} g_{Tx} & 0 & 0 \\ 0 & g_{Ty} & 0 \\ 0 & 0 & g_{Tz} \end{bmatrix} \stackrel{m}{=} \begin{bmatrix} gm_{Tx} I_{Tx} & 0 & 0 \\ 0 & gm_{Ty} I_{Ty} & 0 \\ 0 & 0 & gm_{Tz} I_{Tz} \end{bmatrix}$$

$$G_R = \begin{bmatrix} g_{Rx} & 0 & 0 \\ 0 & g_{Ry} & 0 \\ 0 & 0 & g_{Rz} \end{bmatrix} \stackrel{m}{=} \begin{bmatrix} gm_{Rx} ge_{Rx} & 0 & 0 \\ 0 & gm_{Ry} ge_{Ry} & 0 \\ 0 & 0 & gm_{Rz} ge_{Rz} \end{bmatrix}$$

In general, the effective turn area can vary from antenna to antenna owing, for example, to manufacturing tolerances. Moreover, the effective turn area of the antennas is generally temperature (and perhaps pressure) dependent owing to thermal expansion of the molded antenna assembly and (possibly) the shield. The transmitter current amplitude and phase as well as the receiver electronics gain and phase can also vary from assembly to assembly and with downhole temperature during use. Calibration is intended to remove this variability and thereby enable accurate and reliable electromagnetic measurements.

It will be understood that tilted transmitters and tilted receivers may be similarly modeled. For example, for a tilted transmitter, the gain may be modeled as the product of an antenna gain (effective turn area $gm_T$) and the transmitter current ($I_T$) such that:

$$G_T = \begin{bmatrix} g_{Tx} \\ 0 \\ g_{Tz} \end{bmatrix} = \begin{bmatrix} gm_{Tx} I_T \\ 0 \\ gm_{Tz} I_T \end{bmatrix}$$

$$gm_{Tx} = gm_T \sin(\beta)$$

$$gm_{Tz} = gm_T \cos(\beta)$$

where $\beta$ represents the tilt angle of the transmitter. It will, of course, be understood that the gain of a tilted receiver can be modeled similarly.

For the general case of rotation and static bending it will be understood that the rotated tensor couplings (shown in the parentheses in Equation 13) may be expressed mathematically in harmonic form, for example, as follows:

$$R_T^t Z R_R = Z_{DC} Z_{FHC} \cos(\theta) + Z_{FHS} \sin(\theta) + Z_{SHC} \cos(2\theta) + Z_{SHS} \sin(2\theta)$$

The antenna voltages may be measured as the tool rotates (e.g., during drilling). The measured voltages may be fit to a function of the rotation angle $\theta$ (as shown in Equation 15 below) to obtain the average (DC), first-harmonic cosine (FHC), first harmonic sine (FHS), second harmonic cosine (SHC), and second harmonic sine (SHS) voltage coefficients.

$$V = V_{DC} V_{FHC} \cos(\theta) V_{FHS} \sin(\theta) + V_{SHC} \cos(2\theta) + V_{SHS} \sin(2\theta) \qquad \text{EQUATION 14}$$

These voltage coefficients (harmonics) may be considered to be the "measured" antenna voltages as they represent the antenna measurement input into the gain compensation processing. The measured voltage coefficients may therefore be expressed as follows:

$$V_{DC} \stackrel{m}{=} G_T m_T^t R_T^t Z_{DC} R_R R_\gamma m_R G_R \qquad \text{EQUATION 15}$$

$$V_{FHC} \stackrel{m}{=} G_T m_T^t R_T^t Z_{FHC} R_R R_\gamma m_R G_{Rj}$$

-continued $$V_{FHS} \stackrel{m}{=} G_T m_T^t R_T^t Z_{FHS} R_R R_\gamma m_R G_R$$

$$V_{SHC} \stackrel{m}{=} G_T m_T^t R_T^t Z_{SHC} R_R R_\gamma m_R G_R$$

$$V_{SHS} \stackrel{m}{=} G_T m_T^t R_T^t Z_{SHS} R_R R_\gamma m_R G_R$$

Although the calibration and processing methodology disclosed herein applies to the general case (described above with respect to Equation 13), it can be instructive to describe the physics for an example with negligible drill string bending (the disclosed embodiments are not limited in this regard). When BHA bending is negligible, both the transmitter and receiver moments rotate about the same axis (i.e., a common z-axis). In this case, the transmitter and receiver rotation matrices $R_T$ and $R_R$ through the angle $\theta$ may be expressed as follows:

$$R_T = R_R = R_\theta = \begin{bmatrix} \cos(\theta) & -\sin(\theta) & 0 \\ \sin(\theta) & \cos(\theta) & 0 \\ 0 & 0 & 1 \end{bmatrix} \quad \text{EQUATION 16}$$

The rotated tensor couplings may be expressed as follows:

$$R_\theta^t Z R_\theta = Z_{DC} + Z_{FHC} \cos(\theta) Z_{FHS} \sin(\theta) + Z_{SHC} \cos(2\theta) + Z_{SHS} \sin(2\theta) \quad \text{EQUATION 17}$$

where:

$$Z_{DC} = \begin{bmatrix} \frac{Z_{xx}+Z_{yy}}{2} & \frac{(Z_{xy}-Z_{yx})}{2} & 0 \\ -\frac{(Z_{xy}-Z_{yx})}{2} & \frac{Z_{xx}+Z_{yy}}{2} & 0 \\ 0 & 0 & Z_{zz} \end{bmatrix} \quad \text{EQUATION 18}$$

$$Z_{FHC} = \begin{bmatrix} 0 & 0 & Z_{xz} \\ 0 & 0 & Z_{yz} \\ Z_{zx} & Z_{zy} & 0 \end{bmatrix}$$

$$Z_{FHS} = \begin{bmatrix} 0 & 0 & Z_{yz} \\ 0 & 0 & -Z_{xz} \\ Z_{zy} & -Z_{zx} & 0 \end{bmatrix}$$

$$Z_{SHC} = \begin{bmatrix} \frac{Z_{xx}-Z_{yy}}{2} & \frac{(Z_{xy}+Z_{yx})}{2} & 0 \\ \frac{(Z_{xy}+Z_{yx})}{2} & -\frac{(Z_{xx}-Z_{yy})}{2} & 0 \\ 0 & 0 & 0 \end{bmatrix}$$

$$Z_{SHS} = \begin{bmatrix} \frac{(Z_{xy}+Z_{yx})}{2} & -\frac{(Z_{xx}-Z_{yy})}{2} & 0 \\ -\frac{(Z_{xx}-Z_{yy})}{2} & -\frac{(Z_{xy}+Z_{yx})}{2} & 0 \\ 0 & 0 & 0 \end{bmatrix}$$

It will be understood that the disclosed embodiments are not limited to the use of triaxial transmitter and triaxial receivers as depicted on FIG. 2. For example, the disclosed embodiments may also be used for transmitters and receivers employing tilted antennas or for embodiments in which one of the transmitter and receiver employs a tilted antenna and the other employs triaxial antennas. Tilted antenna gains may be treated as described above.

Calibration Methodology

Figure 4:
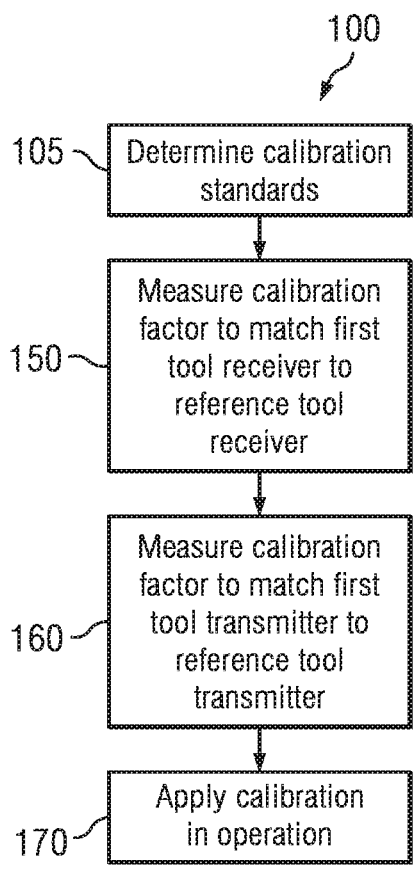
FIG. 4 depicts a flow chart of one disclosed method embodiment.

FIG. 4 depicts a flow chart of one disclosed method embodiment 100. Calibration standards are determined for a reference tool including a reference transmitter and a reference receiver at 105. A first calibration factor is measured to match a first tool receiver (i.e., the receiver of a tool to be calibrated) with the reference tool receiver at 150. A second calibration factor is measured to match a transmitter of the first tool (the transmitter of a tool to be calibrated) with a reference tool transmitter at 160. The calibration factors are then applied to the measurements made by the first tool during (or after) a logging operation at 170 to compute calibrated logging measurements. Example embodiments of each of these processes are described in more detail below for both tilted and triaxial antenna arrangements. The method above may be extended to axial and transverse antenna arrangements.

Figure 5:
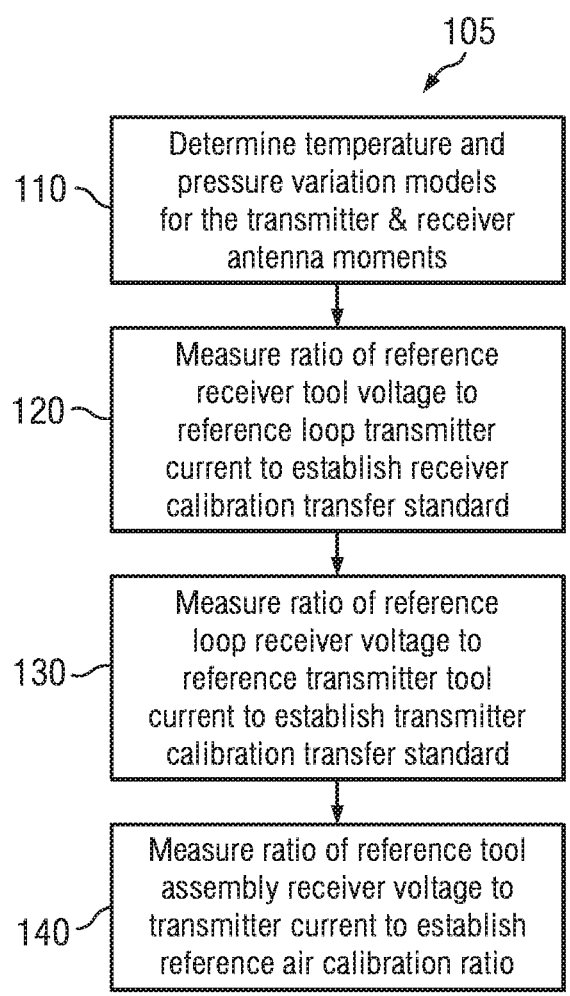
FIG. 5 depicts a flow chart of one disclosed embodiment providing further detail of element 105 in the flow chart depicted on FIG. 4.

FIG. 5 depicts a flow chart of one disclosed embodiment providing further detail regarding element 105 of method 100 depicted on FIG. 4. At 110 temperature and pressure variation models are determined for transmitter and receiver moments. These models include calibration equations that relate a change in an effective turn area of the transmitter and/or receiver antennas to temperature and/or pressure (e.g., the downhole temperature and pressure). A ratio of a reference receiver tool voltage to a reference loop transmitter current is measured to establish a receiver calibration transfer standard at 120. A ratio of a reference loop receiver voltage to a reference transmitter tool current is measured to establish a transmitter calibration transfer standard at 130. And at 140 a ratio of a reference tool assembly receiver voltage to transmitter current is measured to establish a reference air calibration ratio.

Changes in Temperature and Pressure

Figure 6:
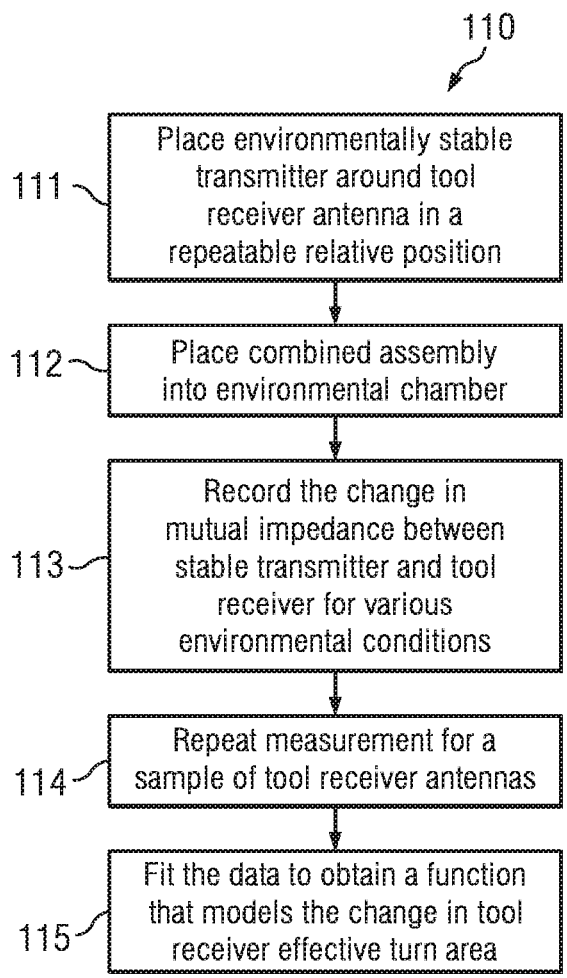
FIG. 6 depicts a flow chart of one disclosed embodiment providing further detail of element 110 in the flow chart depicted on FIG. 5.

FIG. 6 depicts a flow chart of one disclosed embodiment providing further detail of element 110 in the flow chart depicted on FIG. 5. At 111 an environmentally stable transmitter is deployed around a tool receiver antenna in a repeatable position with respect to the tool receiver antenna. The combined assembly (the deployment described in 111) is then deployed in an environmental chamber at 112. Changes in the mutual impedance (or the electromagnetic coupling) between the environmentally stable transmitter and the tool receiver are measured and recorded at 113 at various environmental conditions (e.g., over a range of temperatures observed in downhole logging operations). At 114, steps 111, 112, and 113 may then repeated for a number of tool receiver antennas (e.g., for each of the individual antennas in a triaxial receiver). The acquired data may then be fit to an appropriate function at 115 that models the change in tool receiver effective turn area as a function of temperature.

The effective gain of transmitter and receiver antennas depends on the temperature and pressure at which they are employed. For example, thermal expansion of the materials that make up the antenna assembly with increasing temperature tend to increase the effective area of the antenna while increasing pressure tends to compress the antenna materials and reduce the effective area. While the disclosed embodiments are not limited in this regard, both numerical modeling and measured data suggest that the effect of temperature is more significant than that of pressure and that the effect of pressure may be ignored for some operations. In such embodiments, the effective area may be modeled as an effective area at a reference temperature and a factor that models the relative change in the effective area as a function of changing temperature, for example, as in the following equations for a triaxial receiver and a triaxial transmitter:

$$m_{Rx} \stackrel{m}{=} m_{Rx0}(1 + f_{Rx}(T))$$
$$m_{Ry} \stackrel{m}{=} m_{Ry0}(1 + f_{Rx}(T))$$
$$m_{Rz} \stackrel{m}{=} m_{Rz0}(1 + f_{Rz}(T))$$
$$m_{Tx} \stackrel{m}{=} m_{Tx0}(1 + f_{Tx}(T))$$
$$m_{Ty} \stackrel{m}{=} m_{Ty0}(1 + f_{Tx}(T))$$
$$m_{Tz} \stackrel{m}{=} m_{Tz0}(1 + f_{Tz}(T))$$

EQUATION 20 where $m_{Rx}$, $m_{Ry}$, and $m_{Rz}$ represent the effective turn areas of the x-, y-, and z-axis receiver antennas, $m_{Tx}$, $m_{Ty}$, and $m_{Tz}$ represent the effective turn areas of the x-, y-, and z-axis transmitter antennas, $m_{Rx0}$, $m_{Ry0}$, and $m_{Rz0}$ represent the effective turn areas of the receiver antennas at the reference temperature, $m_{Tx0}$, $m_{Ty0}$, and $m_{Tz0}$ represent the effective turn areas of the transmitter antennas at the reference temperature, $f_{Rx}$ and $f_{Rz}$ represent the for the x- and z-axis receiver antennas, and $f_{Tx}$ and $f_{Tz}$ represent the functions of the change in effective area with temperature for the x- and z-axis transmitter antennas.

With reference to Equation 20, the effect of temperature may be modeled for each of the antennas in the triaxial transmitter and receiver. Each antenna may have a corresponding effective turn area at the reference temperature. However, the functions of the change in effective area for the transverse antennas (the x and y antennas) are generally about equal (such that $f_{Rx}$ may be used for each of the x- and y-axis receivers and $f_{Tx}$ may be used for each of the x- and y-axis transmitters). Since transmitter and receiver antenna designs are sometimes different from one another, the transmitting and receiving antennas are modeled separately in Equation 20 (although the disclosed embodiments are by no means limited in this regard).

With reference again to Equation 20, f(T) may be defined, for example, as follows:

$$f(T) \approx \xi \Delta T \qquad \text{EQUATION 21}$$

where $\xi$ is an effective coefficient of thermal expansion, and $\Delta T$ represents a temperature difference between a measured temperature and the reference temperature.

It will be understood that in certain embodiments it may not be practical to characterize each antenna on each manufactured logging tool collar. In some embodiments, effect of varying pressure and temperature may be evaluated over an ensemble of representative antennas. In embodiments in which the antenna to antenna variation is determined to be small (or repeatable with minimal hysteresis) the measured change in temperature for a representative sample of antennas may be fit to obtain a function that models the relative change in the effective area.

Reference Receiver

Figure 7:
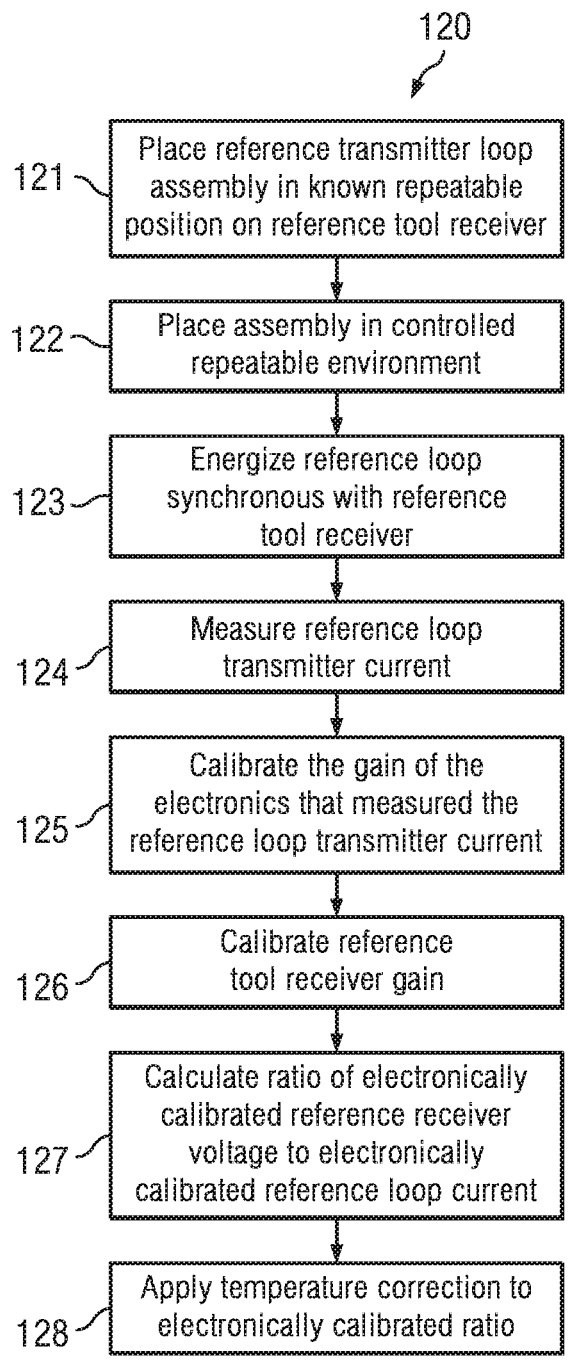
FIG. 7 depicts a flow chart of one disclosed embodiment providing further detail of element 120 in the flow chart depicted on FIG. 5.

FIG. 7 depicts a flow chart of one disclosed embodiment providing further detail of element 120 in the flow chart depicted on FIG. 5. A reference tool including a reference receiver is provided. At 121 a reference transmitter loop assembly is deployed in a known repeatable position about one of the receiving antennas on the reference tool receiver. The combined assembly (the deployment described in 121) is then deployed in a controlled repeatable environment (such as a lab or an environmental chamber or some other controlled environment) at 122. The reference loop transmitter assembly is energized at 123 to establish an electromagnetic coupling with the reference tool receiver and the reference loop transmitter current is measured at 124. The gain of the transmitter electronics used to measure the reference loop transmitter current in 124 is calibrated in 125 and the reference tool receiver gain is calibrated in 126. A ratio of an electronically calibrated reference receiver voltage to an electronically calibrated reference loop transmitter current is computed in 127. A temperature correction is applied to the computed ratio in 128.

As described above, a calibration (test) loop is mounted on a reference receiver on the reference tool. The calibration loop is energized and a corresponding voltage is measured on the reference receiver to determine the coupling between the test loop transmitter and the reference receiver. The test loop may then be subsequently used to match a logging tool receiver (i.e., a receiver to be calibrated) to the reference receiver. To ensure consistency with subsequent calibrations it is desirable that (i) the geometry of the reference loop receiver(s) is/are stable such that its magnetic moment does not change for subsequent calibrations; (ii) the deployment of the calibration loop onto the logging tool be sufficiently repeatable to ensure repeatable coupling between the test loop and the receiver antenna; and (iii) the conductivity of the environment in the vicinity of the logging tool and the test loop be the same for subsequent calibrations so that the total coupling between the loop and the antenna is repeatable.

Figure 8A:
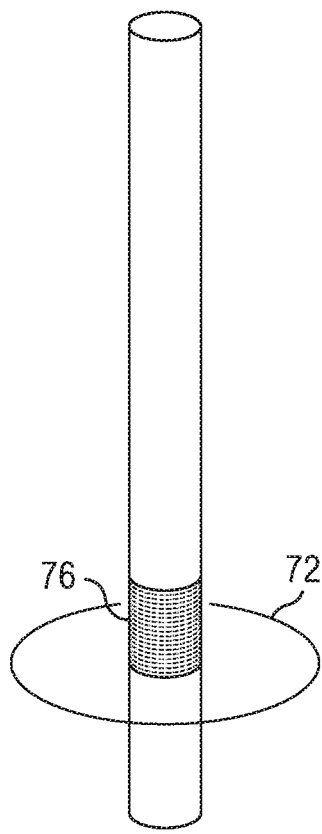
FIGS. 8A and 8B depict example calibration loops deployed on axial (8A) and transverse (8B) reference receivers.
Figure 8B:
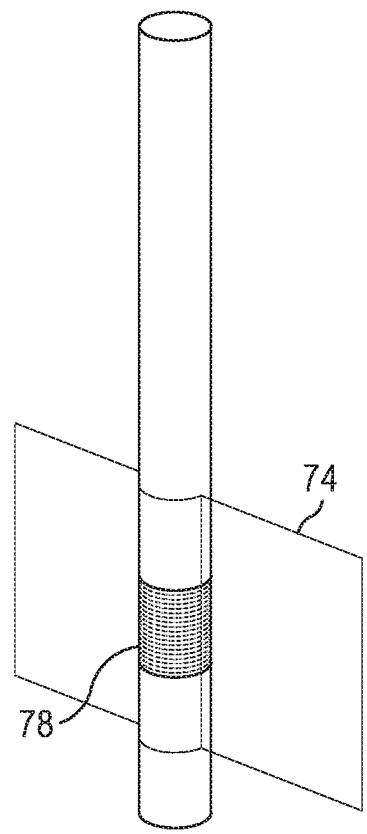

FIGS. 8A and 8B depict example calibration loops 72 and 74 deployed on axial (8A) 76 and transverse (8B) 78 reference receivers. It has been observed (via both modeling and experimental testing) that the direct coupling between the test loop and the reference receiver antenna tends to be insensitive to the loop geometry and placement/orientation. The sensitivity to small variations in the calibration loop 72, 74 orientation on the corresponding receiver 76, 78 may be of a second order when the loop moment vector is nearly aligned with the antenna moment vector (i.e., such that an axial test loop is deployed on an axial reference receiver and a transverse test loop is deployed on a transverse reference receiver). For a large test loop (such as depicted on FIGS. 8A and 8B), the coupling error can be much less than 0.01 dB for a 0.2-degree error in the relative orientation of the test loop and the receiver antenna. Notwithstanding, for certain applications, sufficient sensitivity remains that that it may be desirable to control the conductivity of the environment at least a few feet around the setup.

It will be understood that in the above described calibration scheme the coupling value (impedance) between the test loop(s) and the reference receiver antenna(s) do not need to be determined (i.e., they can remain unknown). Moreover, the methodology does not rely on a mathematical or empirical model of the coupling (impedance) between the test loop and the reference receiver antenna. The methodology advantageously only requires that the coupling be repeatable.

With reference again to FIG. 7, upon energizing the calibration (test) loop at 143, the corresponding reference receiver voltage can be measured at 146. For example, when a transverse test loop is deployed on a transverse reference receiver, the measured voltage $V_{LRrefx\_meas}$ may be expressed as follows:

$$V_{LRrefx\_meas} \stackrel{m}{=} (gm_{Rxref}ge_{Rxref}Z_{LxRx})I_{Lx} \qquad \text{EQUATION 22}$$

where $I_{Lx}$ represents the test loop current applied to the transverse test loop at 143, $Z_{LxRx}$ represents the mutual inductive coupling impedance between the transverse test loop and the transverse receiver antenna, $gm_{Rxref}$ represents relative effective turn area of the reference transverse receiver, and $ge_{Rxref}$ represents the electronic gain of the transverse reference receiver (i.e., the gain of the reference receiver measurement electronics that measures the x channel voltage).

Similarly, when an axial test loop is deployed on an axial reference receiver, the measured voltage $V_{LRrefz\_meas}$ may be expressed as follows:

$$V_{LRrefz\_meas} \stackrel{m}{=} (gm_{Rzref} ge_{Rzref} Z_{LzRz}) I_{Lz} \quad \text{EQUATION 23}$$

where $I_{Lz}$ represents the test loop current applied to the axial test loop at 143, $Z_{LzRz}$ represents the mutual inductive coupling impedance between the axial test loop and the axial receiver antenna, $gm_{Rzref}$ represents relative effective turn area of the reference axial receiver, and $ge_{Rzref}$ represents the electronic gain of the axial reference receiver (i.e., the gain of the reference receiver measurement electronics that measures the z channel voltage).

Figure 9:
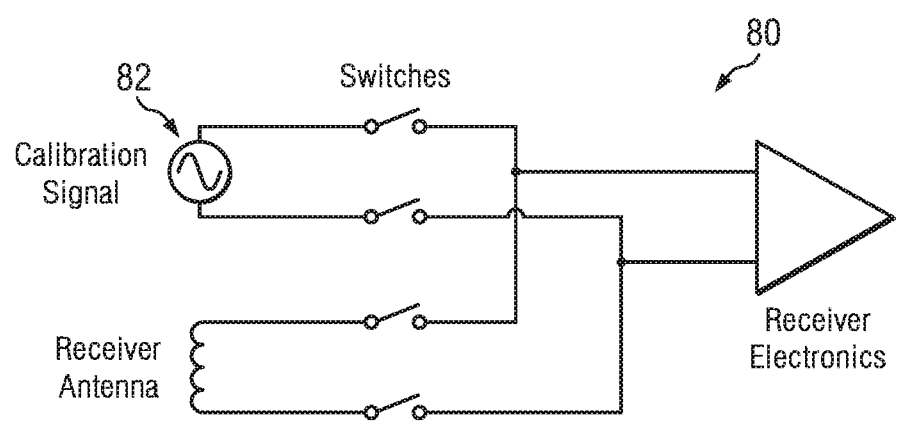
FIG. 9 depicts an example receiver electronics calibration circuit.

With continued reference to FIG. 7, the current in the energized test loop $I_{Lx}$ and $I_{Lz}$ may be measured via the use of calibrated laboratory equipment having known gains a $g_{eTLx}$ and $g_{eTLz}$. The electronic gain of the reference receiver $ge_{Rxref}$ and $ge_{Rzref}$ can be measured by the tool itself. For example, electronic gains may be determined by switching in a calibration reference signal 82 as shown in circuit 80 of FIG. 9 (in a way similar to procedures used in induction logging tools). The alternating current (AC) calibration signal 82 may be generated by a precision digital to analog converter and buffered with fast precision operation amplifiers (although the disclosed embodiments are not limited in this regard).

Using such a calibration circuit, the measured transverse and axial receiver electronics gains a $g_{eRx\_meas}$ and a $g_{eRz\_meas}$ of the reference receiver may be defined as the ratio of the calibration signal measured by the receiver electronics to the known calibration signal, for example, as follows:

$$g_{eRx\_meas} \stackrel{def}{=} \frac{V_{Rxcal\_meas}}{V_{cal}} \quad \text{EQUATION 24}$$

$$g_{eRz\_meas} \stackrel{def}{=} \frac{V_{Rzcal\_meas}}{V_{cal}}$$

where $V_{Rxcal\_meas}$ and $V_{Rzcal\_meas}$ represent the calibration signal (voltage) as measured by the transverse and axial reference receiver electronics and $V_{cal}$ represent the known AC calibration signal.

With further reference to elements 125-128 of FIG. 7, reference loop calibration standards (for the transverse and axial reference receivers) may be obtained by calibrating/correcting the reference receiver voltages: (i) the temperature dependence of the effective turn area of the reference receiver antenna by correcting the measurements to a reference temperature (for example 25 degrees C.) (ii) the current measurement gain in the test loop transmitter, (iii) the electronic gain in the reference receiver antenna electronics, for example, as follows:

$$C_{Rxloop\_ref} \stackrel{def}{=} \frac{1}{(1+f_{Rx}(T_{meas}))} g_{eTLx} \frac{1}{ge_{Rxref}} \left[\frac{V_{LxRxref\_meas}}{I_{Lxmeas}}\right] \stackrel{m}{=} m_{Rx0ref} Z_{LxRx} \quad \text{EQUATION 25}$$

-continued $$C_{Rzloop\_ref} \stackrel{def}{=} \frac{1}{(1+f_{Rz}(T_{meas}))} g_{eTLz} \frac{1}{ge_{Rzref}} \left[\frac{V_{LzRzref\_meas}}{I_{Lzmeas}}\right] \stackrel{m}{=} m_{Rz0ref} Z_{LzRz}$$

where $C_{Rxloop\_ref}$ and $C_{Rzloop\_ref}$ represent calibration factors for the transverse and axial reference receivers that are obtained by electromagnetically coupling the test loop and the corresponding reference receiver and $m_{Rx0ref}$ and $m_{Rz0ref}$ represent the effective turn areas of the transverse and axial reference receivers. It will be appreciated that the first term in Equation 25 represents the temperature correction (as described above), $g_{eTLx}$ a and $g_{eTLz}$ represent the known gains of the electronics used to measure the transverse and axial test loop currents, and $ge_{Rxref}$ and $ge_{Rzref}$ represent the electronic gains in the transverse and axial reference receivers. Note also that the calibration factors $C_{Rxloop\_ref}$ and $C_{Rzloop\_ref}$ equal the product of the effective relative turn area of the reference tool receiver at the reference temperature and the mutual inductive coupling between the loop antenna and the reference tool receiver.

Reference Transmitter

Figure 10:
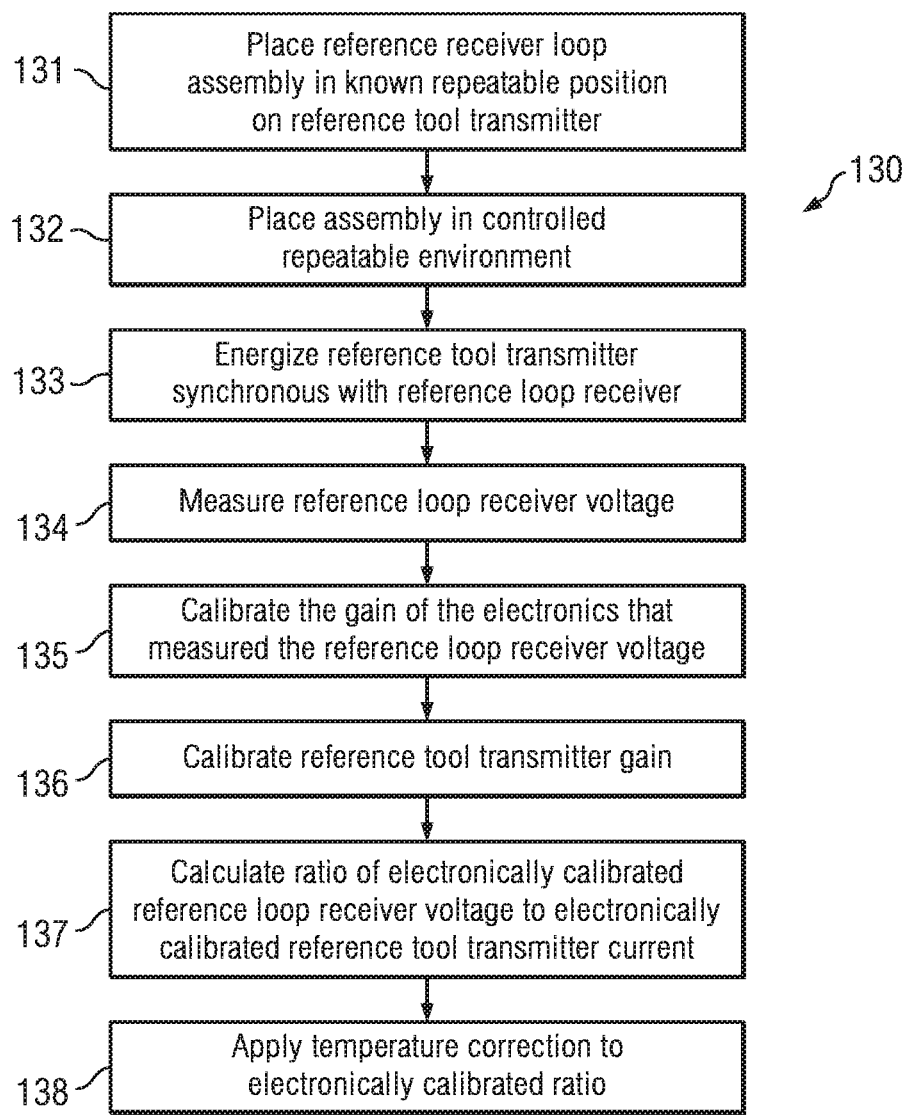
FIG. 10 depicts a flow chart of one disclosed embodiment providing further detail of element 130 in the flow chart depicted on FIG. 5.

FIG. 10 depicts a flow chart of one disclosed embodiment providing further detail of element 130 in the flow chart depicted on FIG. 5. A reference tool including a reference transmitter is provided. At 131 a reference receiver loop assembly is deployed in a known repeatable position about one of the transmitting antennas on the reference tool transmitter. The combined assembly (the deployment described in 131) is then deployed in a controlled repeatable environment (such as a lab or an environmental chamber or some other controlled environment) at 132. The reference tool transmitter is energized at 133 to establish an electromagnetic coupling with the reference loop receiver and the corresponding reference loop receiver voltage is measured at 134. The gain of the electronics used to measure the reference loop receiver current in 134 is calibrated in 135 and the reference tool transmitter gain is calibrated in 136. A ratio of an electronically calibrated reference loop receiver voltage obtained in 134 to an electronically calibrated reference tool transmitter current is computed in 137. A temperature correction is applied to the computed ratio in 138.

The setup used to determine the reference transmitter calibration standard is the same as that described above for the reference receiver, with the exception that the reference tool transmitter is energized and the induced voltage is measured on the calibration loop. The voltage in the reference loop can be measured with calibrated laboratory equipment or with a copy of the same circuitry used to measure the reference tool receiver voltage as described above. The current in the transmitter antenna in the reference can be measured using a transformer with a known well-defined turn ratio, precision, resistor, and measurement electronics with calibration circuitry similar to that discussed above $$I_{T\_meas} \stackrel{m}{=} g_{eT} Rn I_T \quad \text{EQUATION 26}$$

where $I_{T\_meas}$ represents the measured current in the reference tool transmitter (such as a tilted transmitter), $I_T$ represents the actual current in the transmitter, $g_{eT}$ represents the electronic gain of the transmitter current measuring electronics in the reference transmitter, n represents the transformer turn ratio, R represents the resistance of a load resistor. Likewise, the measured currents $I_{Tx\_meas}$ and $I_{Tz\_meas}$ in transverse and axial transmitters may be given as follows:

$$I_{Tx\_meas} \stackrel{m}{=} g_{eTx} Rn I_{Tx}$$

$$I_{Tz\_meas} \stackrel{m}{=} g_{eTz} Rn I_{Tz}$$

where $I_{Tx}$ and $I_{Tz}$ represent the actual currents in the transverse and axial transmitters and a $g_{eTx}$ and a $g_{eTz}$ represent the electronic gains of the transmitter current measuring electronics in the transverse and axial reference transmitters.

Figure 11:
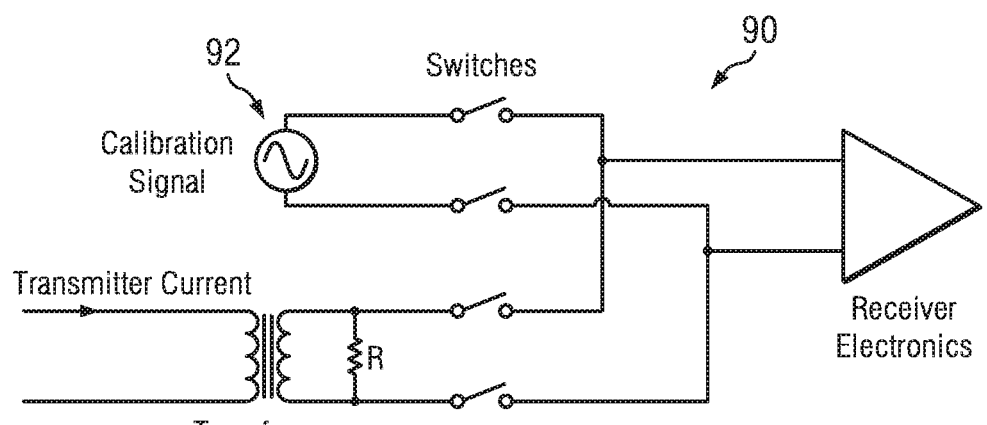
FIG. 11 depicts an example transmitter electronics calibration circuit.

FIG. 11 represents an example calibration circuit 90 for use in measuring the transmitter gains a $g_{eT}$, $g_{eTx}$, and/or a $g_{eTz}$. The circuit is similar to that depicted on FIG. 9 for use with the reference receivers in that it includes switching in and out a known calibration signal 92. Using such a calibration circuit, the measured reference transmitter electronics gains $g_{eT\_meas}$, $g_{eTx\_meas}$ and a $g_{eTz\_meas}$ may be defined (as above with the reference receivers) as the ratio of the calibration signal measured by the receiver electronics to the known calibration signal, for example, as follows:

$$g_{eT\_meas} \stackrel{def}{=} \frac{V_{Tcal\_meas}}{V_{cal}} \qquad \text{EQUATION 27}$$

$$g_{eTx\_meas} \stackrel{def}{=} \frac{V_{Txcal\_meas}}{V_{cal}}$$

$$g_{eTz\_meas} \stackrel{def}{=} \frac{V_{Tzcal\_meas}}{V_{cal}}$$

where $V_{Tcal\_meas}$, $V_{Txcal\_meas}$, and $V_{Tzcal\_meas}$ represent the calibration signals (voltages) as measured by the reference transmitters and $V_{cal}$ represent the known AC calibration signal. It will be understood that in certain embodiments since only one transmitter fires at a time, it may be possible to only have one measurement channel to measure each of the antenna currents such that there would only be one electronic gain for the reference transmitter. The disclosed embodiments are, of course, not limited in this regard.

As described above for the reference receiver (and with further reference to elements 135-138 of FIG. 10), calibration standards for the reference transmitters may be obtained applying (i) a temperature correction, (ii) a reference transmitter current measurement gain correction, and (iii) a receiver loop voltage measurement correction, for example, as follows:

$$C_{Txloop\_ref} \stackrel{def}{=} \frac{1}{(1+f_{Tx}(T_{meas}))}(g_{eTmeas}Rn)\frac{1}{g_{eLx\_meas}}\left[\frac{V_{TLxref\_meas}}{I_{Txmeas}}\right] \stackrel{m}{=} m_{Tx0ref} Z_{TLx} \qquad \text{EQUATION 28}$$

$$C_{Tzloop\_ref} \stackrel{def}{=} \frac{1}{(1+f_{Tz}(T_{meas}))}(g_{eTmeas}Rn)$$

$$\frac{1}{g_{eLz\_meas}}\left[\frac{V_{TLzref\_meas}}{I_{Tzmeas}}\right] \stackrel{m}{=} m_{Tz0ref} Z_{TLz}$$

where $C_{Txloop\_ref}$ and $C_{Tzloop\_ref}$ represent calibration factors for the transverse and axial reference transmitters that are obtained by electromagnetically coupling the test loop and the corresponding reference transmitter and $m_{Tx0ref}$ and $m_{Tz0ref}$ represent the effective turn areas of the transverse and axial reference transmitters It will be appreciated that the first term in Equation 28 represents the temperature correction (as described above), $g_{eTLx}$ and a $g_{eTLz}$ represent the gains of the electronics used to measure the test loop currents, and $ge_{Rxref}$ and $ge_{Rzref}$ represent the gains in the reference receivers.

Air Calibration

Figure 12:
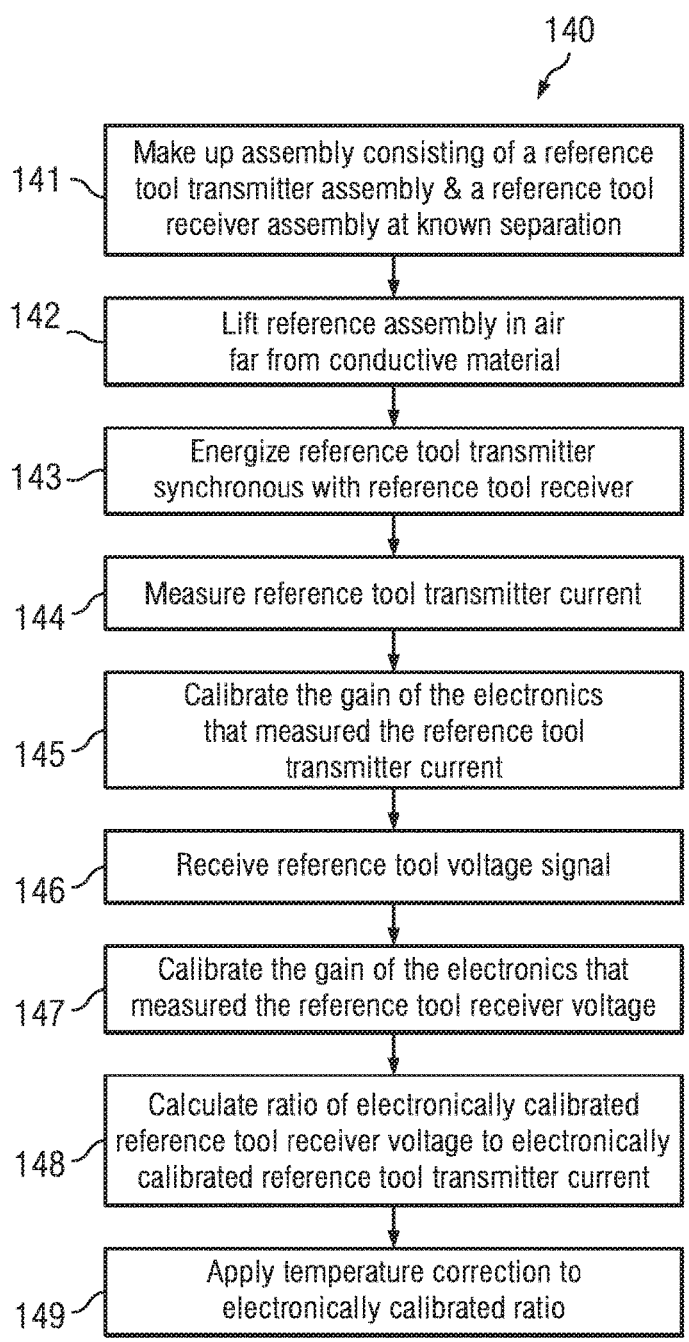
FIG. 12 depicts a flow chart of one disclosed embodiment providing further detail of element 140 in the flow chart depicted on FIG. 5.
Figure 13:
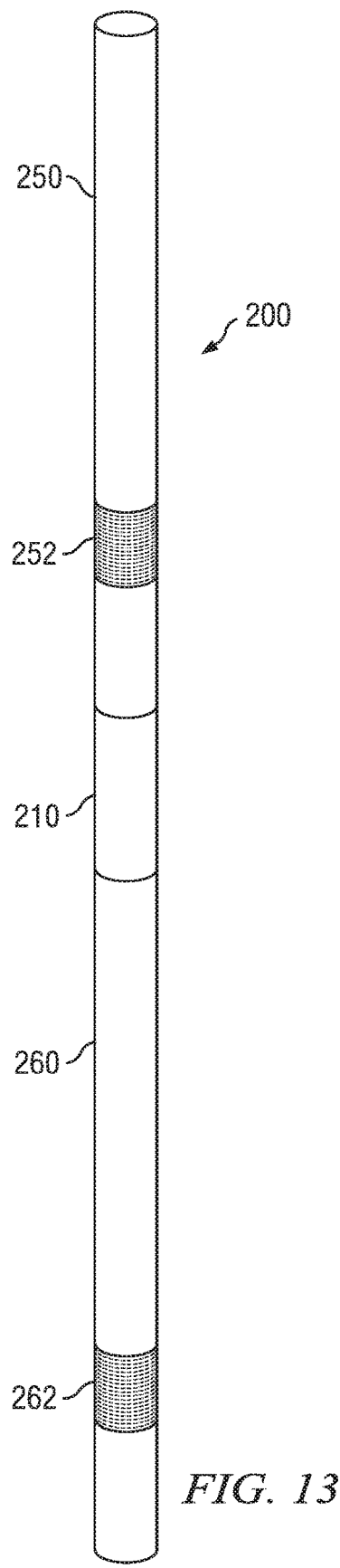
FIG. 13 depicts one example of a reference air calibration setup including a reference transmitter and a reference receiver.

FIG. 12 depicts a flow chart of one disclosed embodiment providing further detail of element 140 in the flow chart depicted on FIG. 5. At 141 a reference assembly is prepared including a reference tool transmitter assembly and a reference tool receiver assembly at know separation. One example reference assembly 200 is depicted on FIG. 13 in which the reference transmitter tool 250 includes a reference transmitter 252 and the reference receiver tool 260 includes a reference receiver 262. The reference transmitter and reference receiver may be separated by substantially any suitable distance, for example, using a spacer sub 210.

With reference again to FIG. 12, the reference assembly 200 is deployed in a known environment at 142, for example, lifted high into the air up and away from electrically conductive materials (e.g., using a crane). The reference tool transmitter 252 is energized at 143 to establish an electromagnetic coupling with the reference tool receiver 262 and the reference tool transmitter current is measured at 144. The gains of the electronics that are used to measure the reference tool transmitter current are calibrated at 145. Energizing the reference tool transmitter 252 induces a voltage in the reference tool receiver 262 which is measured (received) at 146 using electronics in the reference tool receiver 262. The gains of the electronics that are used to measure the reference tool receiver voltage are then calibrated at 147. A ratio of the electronically calibrated reference tool receiver voltage to the electronically calibrated reference tool transmitter current is calculated at 148 and a temperature correction is applied to the calculated ratio at 149.

The axial and transverse voltages $V_{zz\_air}$ and $V_{xx\_air}$ measured at 146 by axial and transverse (z-axis and x-axis) antennas in the reference tool receiver may be modeled, for example, as follows:

$$V_{zz\_air} \stackrel{m}{=} g_{eRz}(gm_{Rzref} gm_{Tzref} Z_{TRz_{air}}) I_{Tz} \qquad \text{EQUATION 29}$$

$$V_{xx\_air} \stackrel{m}{=} g_{eRx}(gm_{Rxref} gm_{Txref} Z_{TRxair}) I_{Tx}$$

where $Z_{TR_{zair}}$ and $Z_{TRxair}$ represent the (nominal) mutual impedances between the axial and transverse reference transmitter antennas and reference receiver antennas in air (or the known environment), $gm_{Rzref}$ and $gm_{Rxref}$ represent the relative effective moments of the axial and transverse reference receiver antennas at the ambient conditions during measurement, $gm_{Tzref}$ and m a $gm_{Txref}$ represent the relative effective moments of the axial and transverse reference transmitter antennas at the ambient conditions during the measurement, $g_{eRz}$ and $g_{eRx}$ represent the gains of the electronics used to measure the voltage signals in the axial and transverse reference receiver antennas, and $I_{Tx}$ and $I_{Tz}$ represent the axial and transverse reference transmitter currents.

Master calibration coefficients for the reference tool may then be constructed from the ratio of the electronically calibrated reference transmitter current to the electronically calibrated reference receiver voltage multiplied by the factors used to scale the reference transmitter and reference receiver relative effective moments to reference temperature conditions. Assuming that the calibrations are accurate, these master calibration coefficients are equal to the inverse of the product of the relative reference transmitter and reference receiver antenna moments at reference conditions multiplied by the coupling impedance between the reference transmitter and receiver antennas. For example, axial and transverse master calibration coefficients $C_{zzair}$ and $C_{xxair}$ may be represented mathematically as follows (and are obtained by electromagnetically coupling the reference transmitters and reference receivers):

$$C_{zzair} \stackrel{def}{=} [(1+f_{Tz}(T_{meas}))(1+f_{Rz}(T_{meas}))]$$

$$\left[\frac{ge_{Rz\_meas}}{Rng_{eT\_meas}}\right]\left[\frac{I_{T\_meas}}{V_{zz\_air}}\right] \stackrel{m}{=} \frac{1}{m_{Rz0ref}m_{Tz0ref}}\frac{1}{Z_{TRzair}}$$

$$C_{xxair} \stackrel{def}{=} [(1+f_{Tx}(T_{meas}))(1+f_{Rx}(T_{meas}))]\left[\frac{ge_{Rx\_meas}}{Rng_{eT\_meas}}\right]$$

$$\left[\frac{I_{T\_meas}}{V_{xx\_air}}\right] \stackrel{m}{=} \frac{1}{m_{Rx0ref}m_{Tx0ref}}\frac{1}{Z_{TRxair}}$$

Matching New Tool Receiver to Reference Tool Receiver

With reference again to FIG. 4 a new tool receiver (i.e., the receiver of a tool to be calibrated) may be matched with the reference tool receiver at 150. To calibrate the new tool receiver, the same (or a virtually identical) calibration test loop setup as was used on the reference receiver is deployed about the new receiver. As with the reference receiver, the test loop is energized to establish an electromagnetic coupling with new receiver. Transverse and axial measured voltages $V_{LxRx\_meas}$ and $V_{LzRz\_meas}$ may be represented mathematically, for example, as follows:

$$V_{LxRx\_meas} \stackrel{m}{=} gm_{Rx}ge_{Rx}Z_{LxRx}I_{Lx} \quad \text{EQUATION 31}$$

$$V_{LzRz\_meas} \stackrel{m}{=} gm_{Rz}ge_{Rz}Z_{LzRz}I_{Lz}$$

where $Z_{LxRx}$ and $Z_{LzRz}$ represent the transverse and axial couplings between the test loop antennas and the new receiver tool antennas. The gains and effective turn areas of the new receiver are as defined previously for the reference receiver.

The calibration coefficients for the new receiver tool may be determined by multiplying the reference loop coefficient by the electronically calibrated ratio of the measured transmitter loop current to measured receiver voltage and the factor that corrects the relative moment change for temperature and pressure. Assuming the calibrations to be accurate, the resulting calibration coefficient is equal to the ratio of the reference receiver turn area to the new receiver turn area:

EQUATION 32

$$C_{Rxloop} \stackrel{def}{=}$$

$$C_{Rxloop\_ref}(1+f_{Rx}(T_{meas}))ge_{Rx\_meas}\frac{1}{ge_{TLx\_meas}}\left[\frac{I_{Lx\_meas}}{V_{LxRx\_meas}}\right]\stackrel{m}{=}\frac{m_{Rx0ref}}{m_{Rx0}}$$

-continued $$C_{Rzloop} \stackrel{def}{=}$$

$$C_{Rzloop\_ref}(1+f_{Rz}(T_{meas}))ge_{Rz\_meas}\frac{1}{ge_{TLz\_meas}}\left[\frac{I_{Lz\_meas}}{V_{LzRz\_meas}}\right]\stackrel{m}{=}\frac{m_{Rz0ref}}{m_{Rz0}}$$

where $C_{Rxloop}$ and $C_{Rzloop}$ represent the calibration coefficients (factors) for the new receiver obtained by electromagnetically coupling the test loop and the receiver, $C_{Rxloop\_ref}$ and $C_{Rzloop\_ref}$ are as defined above in Equation 25, $T_{meas}$ represents the temperature as measured downhole, and the bracketed quantity $$\left[\frac{I_{Lx\_meas}}{V_{LxRx\_meas}}\right]$$

represent the current and voltage measurements. Note that the calibration coefficients for the new receiver tool are equal to a ratio of the effective turn areas of the reference and new tool receivers.

Matching New Tool Transmitter to Reference Tool Transmitter

With continued reference to FIG. 4 a new tool transmitter (i.e., the transmitter of a tool to be calibrated) may be matched with the reference tool transmitter at 160. To calibrate the new tool transmitter, the same (or a virtually identical) calibration test loop setup as was used on the reference transmitter is deployed about the new transmitter. As with the reference transmitter, the test loop is used to measure the corresponding induced voltage when the new tool transmitter is energized (i.e., when the test loop and new transmitter are electromagnetically coupled). Calibration coefficients for the new transmitter can be computed as described above for the new receiver.

$$C_{Txloop} \stackrel{def}{=} C_{Txloop\_ref}(1+f_{Tx}(T_{meas})) \quad \text{EQUATION 33}$$

$$(ge_{Tmeas}Rn)\frac{1}{ge_{RLx\_meas}}\left[\frac{I_{T\_meas}}{V_{TLx\_meas}}\right]\stackrel{m}{=}\frac{m_{Tx0ref}}{m_{Tx0}}$$

$$C_{Tzloop} \stackrel{def}{=} C_{Tzloop\_ref}(1+f_{Tz}(T_{meas}))(ge_{Tmeas}Rn)$$

$$\frac{1}{ge_{RLz\_meas}}\left[\frac{I_{T\_meas}}{V_{TLz\_meas}}\right]\stackrel{m}{=}\frac{m_{Tz0ref}}{m_{Tz0}}$$

where $C_{Txloop}$ and $C_{Tzloop}$ represent the calibration coefficients for the new transmitter obtained by electromagnetically coupling the test loop and the transmitter, $C_{Txloop\_ref}$ and $C_{Tzloop\_ref}$ are as defined above with respect to Equation 28, $T_{meas}$ represents the temperature as measured downhole, and the bracketed quantity $$\left[\frac{I_{T\_meas}}{V_{TLx\_meas}}\right]$$

represent the current and voltage measurements. Note that the calibration coefficients for the new transmitter are equal to a ratio of the effective turn areas of the reference and new tool transmitters.

For the y-axis transverse antennas (both receiver and transmitter) only the ratio of the y antenna effective turn area to the x antenna effective turn is needed. The same test loop used for the x antenna is repositioned over the y antenna and the voltage signals may be measured as described previously:

$$V_{LxRy\_meas} \stackrel{m}{=} gm_{Ry}ge_{Ry}Z_{LxRy}I_{Lx} \qquad \text{EQUATION 34}$$

$$V_{TyLxref\_meas} \stackrel{m}{=} gm_{Ty}ge_{Lx}Z_{TyLx}I_{Ty}$$

where $V_{LxRy\_meas}$ represents the voltage measured on the new tool y-axis receiver upon repositioning and energizing the transverse test loop, $V_{TyLxref\_meas}$ represents the voltage measured on the repositioned transverse test loop when the y-axis transmitter is energized. The transmitter currents, relative turn areas, electronic gains, and coupling impedances are as described previously. The calibration coefficients for the new y-axis receiver antenna and the new y-axis transmitter antenna may be computed as described above.

$$C_{mRxy\_ratio} \stackrel{def}{=} \frac{ge_{Rx\_meas}}{ge_{Ry\_meas}}\left[\frac{V_{LxRy\_meas}}{V_{LxRx\_meas}}\right] \stackrel{m}{=} \frac{m_{Ry0}}{m_{Rx0}} \qquad \text{EQUATION 35}$$

$$C_{mTxy\_ratio} \stackrel{def}{=} \frac{ge_{Tx\_meas}}{ge_{Ty\_meas}}\left[\frac{V_{TyLx\_meas}}{V_{TxLx\_meas}}\right] \stackrel{m}{=} \frac{m_{Ty0}}{m_{Tx0}}$$

where $C_{mRxy\_ratio}$ and $C_{mTxy\_ratio}$ represent the y-axis receiver and transmitter coefficients.

Calibration Examples

The following examples demonstrate the above-described calibration procedure for three electromagnetic logging tool configurations and/or operating conditions. These examples are for purely illustrative purposes and are not intended to limit the disclosed embodiments or the scope of the claims in any way.

Triaxial Transmitter and Triaxial Receiver: Nonrotating

In operation downhole: (i) the y-axis antenna gains may be matched to the x-axis antenna gains and (2) the data may be rotated to align the transmitter and receiver x directions and/or rotated to an Earth-fixed reference frame (e.g., top-of-hole or North). (3) The gains may be matched to the reference tool gains and (4) the reference tool gains may be cancelled by dividing the measurements by the reference tool air calibration values.

In describing this example process, it may be instructive to first define the following matrices:

$$G_{Txy\_ratio} \stackrel{def}{=}$$

$$\begin{bmatrix} 1 & 0 & 0 \\ 0 & \frac{1}{C_{mTxy_{ratio}}C_{eTxy_{ratio}}} & 0 \\ 0 & 0 & 1 \end{bmatrix} \stackrel{m}{=} \begin{bmatrix} 1 & 0 & 0 \\ 0 & \frac{gm_{Tx}}{gm_{Ty}} & 0 \\ 0 & 0 & 1 \end{bmatrix} = \begin{bmatrix} 1 & 0 & 0 \\ 0 & \frac{g_{Tx}}{g_{Ty}} & 0 \\ 0 & 0 & 1 \end{bmatrix}$$

$$G_{Rxy\_ratio} \stackrel{def}{=}$$

$$\begin{bmatrix} 1 & 0 & 0 \\ 0 & \frac{1}{C_{mRxy_{ratio}}C_{eRxy_{ratio}}} & 0 \\ 0 & 0 & 1 \end{bmatrix} \stackrel{m}{=} \begin{bmatrix} 1 & 0 & 0 \\ 0 & \frac{gm_{Rx}}{gm_{Ry}} & 0 \\ 0 & 0 & 1 \end{bmatrix} = \begin{bmatrix} 1 & 0 & 0 \\ 0 & \frac{g_{Rx}}{g_{Ry}} & 0 \\ 0 & 0 & 1 \end{bmatrix}$$

where $G_{Txy\_ratio}$ represents a ratio of the x-axis to y-axis transmitter gains and $G_{Rxy\_ratio}$ represents a ratio of the x-axis to y-axis receiver gains.

Applying these ratios to the measured voltage harmonics replaces the y-axis transmitter and y-axis receiver gains with the x-axis transmitter and x-axis receiver gains. The voltage measurements can then be mathematically rotated (in this example embodiment). The measurement tool is essentially non-rotating (e.g., sliding) in the wellbore. For the DC voltages measured between the transmitter and receiver, the measurements are back rotated by the measured alignment angle γm which if manufacturing variation is small, is close to the actual alignment angle α. This procedure essentially mathematically constructs measurements $V_{rot}$ equivalent to that of a rotationally aligned transmitter (T1) and receiver (R1).

$$V_{rot} \stackrel{def}{=} G_{Txy\_ratio}VG_{Rxy\_ratio}R^t_{\gamma m} \qquad \text{EQUATION 36}$$

$$V_{rot} \stackrel{def}{=} G_{Txy\_ratio}VG_{Rxy\_ratio}R^t_{\gamma m}$$

The rotated voltage matrix may be expressed in matrix form, for example, as follows:

$$V_{rot} \stackrel{m}{=} \begin{bmatrix} g_{Tx}g_{Rx}Z_{xx} & g_{Tx}g_{Rx}Z_{xy} & g_{Tx}g_{Rz}Z_{xz} \\ g_{Tx}g_{Rx}Z_{yx} & g_{Tx}g_{Rx}Z_{yy} & g_{Tx}g_{Rz}Z_{yz} \\ g_{Tz}g_{Rx}Z_{zx} & g_{Tz}g_{Rx}Z_{zy} & g_{Tz}g_{Rz}Z_{zz} \end{bmatrix} \qquad \text{EQUATION 37}$$

After gain matching, the voltages can be rotated from the local tool reference frame to an Earth-fixed frame, for example, as follows:

$$V_{rot\_EF} \stackrel{def}{=} R_{LE}^t V_{rot} R_{LE} \qquad \text{EQUATION 38}$$

After the above described rotations, calibration coefficients may be applied to remove all gains. All measurements involving x-axis and/or y-axis y antennas may have the same calibration coefficient since the x-axis and y-axis gains were previously matched. The following calibration factors may be computed:

$$K_{xx} \stackrel{def}{=} \qquad \text{EQUATION 39}$$

$$C_{xxair}C_{Txloop}C_{Rxloop}\left[\frac{1}{(1+f_{Tx}(T_{meas}))}\right]\left[\frac{1}{(1+f_{Rx}(T_{meas}))}\right]$$

$$\left[\frac{ge_{Tx\_meas}Rn}{I_{Tx\_meas}}\right]\left[\frac{1}{ge_{Rx\_meas}}\right]$$

where $K_{xx}$ represents the calibration quantity obtained by combining the air calibration coefficient $C_{xxair}$ and the calibration coefficients (factors) $C_{Txloop}$ and $C_{Rxloop}$ for the transverse transmitter and the transverse receiver, $$\left[\frac{1}{(1+f_{Tx}(T_{meas}))}\right] \text{ and } \left[\frac{1}{(1+f_{Rx}(T_{meas}))}\right]$$

represent the transmitter and receiver turn area temperature and pressure correction, $$\left[\frac{ge_{Tx\_meas}Rn}{I_{Tx\_meas}}\right]$$

represents the gain corrected transmitter current measurement, and $$\left[\frac{1}{ge_{Rx\_meas}}\right]$$

corrects for the measured receiver gain.

Ideally, the above quantity $K_{xx}$ cancels the effect of temperature on the downhole logging tool such that $K_{xx}$ may be expressed as follows:

$$K_{xx} \stackrel{m}{=} \left[\frac{1}{Z_{TxRxair}}\right]\left[\frac{1}{gm_{Rx}ge_{Rx}}\right]\left[\frac{1}{gm_{Tx}I_{Tx}}\right] = \qquad \text{EQUATION 40}$$

$$\left[\frac{1}{Z_{TxRxair}}\right]\left[\frac{1}{g_{Rx}g_{Tx}}\right]$$

Note that $K_{xx}$ is inversely proportional to the transverse receiver gain $g_{Rx}$ and the transverse transmitter gain $g_{Tx}$ such that multiplying the appropriate downhole measurements by $K_{xx}$ fully cancels these gain terms.

Measurements made using the transverse x-axis and y-axis transmitter and receiver antennas (i.e., the xx, xy, yx, and yy couplings) may be multiplied by $K_{xx}$ thereby canceling all transmitter and receiver gains. Similarly, for measurements made using the axial transmitter and axial receiver (the z-axis transmitter and z-axis receiver), the following quantity can be defined:

$$K_{zz} \stackrel{def}{=} \qquad \text{EQUATION 41}$$

$$C_{zzair}C_{Tzloop}C_{Rzloop}\left[\frac{1}{(1+f_{Tz}(T_{meas}))}\right]\left[\frac{1}{(1+f_{Rz}(T_{meas}))}\right]$$

$$\left[\frac{ge_{Tz\_meas}Rn}{I_{Tz\_meas}}\right]\left[\frac{1}{ge_{Rz\_meas}}\right]$$

where $K_{zz}$ represents the calibration quantity obtained by combining the air calibration coefficient $C_{zzair}$ and the calibration coefficients (factors) $C_{Tzloop}$ and $C_{Rzloop}$ for the axial transmitter and axial receiver, $$\left[\frac{1}{(1+f_{Tz}(T_{meas}))}\right] \text{ and } \left[\frac{1}{(1+f_{Rz}(T_{meas}))}\right]$$

represent the transmitter and receiver turn area correction, $$\left[\frac{ge_{Tz\_meas}Rn}{I_{Tz\_meas}}\right]$$

represents the gain corrected transmitter current measurement, and $$\left[\frac{1}{ge_{Rz\_meas}}\right]$$

corrects for the measured receiver gain.

Ideally, the above quantity $K_{zz}$ cancels the effect of temperature on the downhole logging tool such that $K_{zz}$ may be expressed as follows:

$$K_{zz} \stackrel{m}{=} \left[\frac{1}{Z_{TzRzair}}\right]\left[\frac{1}{gm_{Rz}ge_{Rz}}\right]\left[\frac{1}{gm_{Tz}I_{Tz}}\right] = \qquad \text{EQUATION 42}$$

$$\left[\frac{1}{Z_{TzRzair}}\right]\left[\frac{1}{g_{Rz}g_{Tz}}\right]$$

Note that $K_{zz}$ is inversely proportional to the axial receiver gain $g_{Rz}$ and the axial transmitter gain $g_{Tz}$ such that multiplying the appropriate downhole measurements by $K_{zz}$ fully cancels these gain terms.

The x-axis and z-axis cross axial measurements use a different formulation to account for the fact that there are no cross axial air calibration measurements. Ratios of test loop coefficients may be employed to cancel the cross axial gains, for example, as follows:

$$K_{xz} \stackrel{def}{=} \sqrt{C_{xxair}C_{zzair}}\sqrt{\left[\frac{C_{Tzloop\_ref}}{C_{Txloop\_ref}}\right]\left[\frac{C_{Rxloop\_ref}}{C_{Rzloop\_ref}}\right]} \cdot \qquad \text{EQUATION 43}$$

$$\left[\frac{C_{Txloop}}{(1+f_{Tx}(T_{meas}))}\right]\left[\frac{C_{Rzloop}}{(1+f_{Rz}(T_{meas}))}\right]\left[\frac{ge_{Tx\_meas}Rn}{I_{Tx\_meas}}\right]$$

$$\left[\frac{1}{ge_{Rz\_meas}}\right]$$

Since the air calibration coefficients and reference loop coefficients were measured in an environment with low conductivity (e.g., in air), their phase is small. Therefore, the principal square root can be taken without any risk of phase wrapping such that $K_{xz}$ may be expressed as follows:

$$K_{xz} \stackrel{m}{=} \left[\frac{1}{\sqrt{Z_{TxRxair}}\sqrt{Z_{TzRzair}}}\right]\left[\frac{1}{gm_{Tx}I_{Tx}}\right]\left[\frac{1}{gm_{Rz}ge_{Rz}}\right] = \qquad \text{EQUATION 44}$$

$$\left[\left[\frac{1}{\sqrt{Z_{TxRxair}}\sqrt{Z_{TzRzair}}}\right]\right]\left[\frac{1}{g_{Tx}g_{Rz}}\right]\left[\sqrt{\frac{Z_{LxRx}}{Z_{LxTx}}}\sqrt{\frac{Z_{LzRz}}{Z_{LzRz}}}\right]$$

Owing to electromagnetic reciprocity in which:

$$\sqrt{\frac{Z_{LxRx}}{Z_{LxTx}}} = \sqrt{\frac{Z_{LzRz}}{Z_{LzTz}}} = 1$$

The calibration coefficient may remain independent of the test loop coupling, and may be expressed, for example, as follows:

$$K_{xz} \stackrel{m}{=} \left[\left[\frac{1}{\sqrt{Z_{TxRxair}}\sqrt{Z_{TzRzair}}}\right]\right]\left[\frac{1}{g_{Tx}g_{Rz}}\right]$$

Likewise, $K_{zx}$ may be expressed as follows:

$$K_{zx} \stackrel{def}{=} \sqrt{C_{xxair}C_{zzair}} \sqrt{\left[\frac{C_{Tzloop\_ref}}{C_{Txloop\_ref}}\right]\left[\frac{C_{Rxloop\_ref}}{C_{Rzloop\_ref}}\right]} \cdot$$

$$\left[\frac{C_{Tzloop}}{(1+f_{Tz}(T_{meas}))}\right]\left[\frac{C_{Rxloop}}{(1+f_{Rx}(T_{meas}))}\right]\left[\frac{ge_{Tz\_meas}R_n}{I_{Tz\_meas}}\right]$$

$$\left[\frac{1}{ge_{Rx\_meas}}\right] \quad \text{EQUATION 45}$$

and $$K_{zx} \stackrel{m}{=} \left[\frac{1}{\sqrt{Z_{TxRxair}}\sqrt{Z_{TzRzair}}}\right]\left[\frac{1}{gm_{Tz}I_{Tz}}\right]\left[\frac{1}{gm_{Rx}ge_{Rx}}\right] = \quad \text{EQUATION 46}$$

$$\left[\left[\frac{1}{\sqrt{Z_{TxRxair}}\sqrt{Z_{TzRzair}}}\right]\right]\left[\frac{1}{g_{Tz}g_{Rx}}\right]$$

As described above for $K_{xx}$ and $K_{zz}$, $K_{xz}$ and $K_{zx}$ are inversely proportion to the indicated transmitter and receiver gains such that multiplying the appropriate downhole measurements by $K_{xz}$ and $K_{zx}$ fully cancels the gain terms.

Upon computing $K_{xx}$, $K_{xx}$, $K_{xx}$, and $K_{xx}$ as described above, the rotated and calibrated voltage tensor $V_{rot\_cal}$ may be expressed as follows:

$$V_{rot\_cal} \stackrel{m}{=} \quad \text{EQUATION 47}$$

$$\begin{bmatrix} g_{Tx}g_{Rx}Z_{xx}\cdot K_{xx} & g_{Tx}g_{Rx}Z_{xy}\cdot K_{xx} & g_{Tx}g_{Rz}Z_{xz}\cdot K_{xz} \\ g_{Tx}g_{Rx}Z_{yx}\cdot K_{xx} & g_{Tx}g_{Rx}Z_{yy}\cdot K_{xx} & g_{Tx}g_{Rz}Z_{yz}\cdot K_{xz} \\ g_{Tz}g_{Rx}Z_{zx}\cdot K_{zx} & g_{Tz}g_{Rx}Z_{zy}\cdot K_{zx} & g_{Tz}g_{Rz}Z_{zz}\cdot K_{zz} \end{bmatrix}$$

such that $$V_{rot\_cal;} \stackrel{m}{=}$$

$$\begin{bmatrix} \dfrac{Z_{xx}}{Z_{TxRxair}} & \dfrac{Z_{xy}}{Z_{TxRxair}} & \dfrac{Z_{xz}}{\sqrt{Z_{TxRxair}}\sqrt{Z_{TzRzair}}} \\ \dfrac{Z_{yx}}{Z_{TxRxair}} & \dfrac{Z_{yy}}{Z_{TxRxair}} & \dfrac{Z_{yz}}{\sqrt{Z_{TxRxair}}\sqrt{Z_{TzRzair}}} \\ \dfrac{Z_{zx}}{\sqrt{Z_{TxRxair}}\sqrt{Z_{TzRzair}}} & \dfrac{Z_{zy}}{\sqrt{Z_{TxRxair}}\sqrt{Z_{TzRzair}}}0 & \dfrac{Z_{zz}}{Z_{TzRzair}} \end{bmatrix}$$

Triaxial Transmitter and Triaxial Receiver: Rotating

As described above in the previous example, the y-axis antenna gains may be matched to the x-axis antenna gains. The measured data may be rotated to align the transmitter and receiver x-axis (or y-axis) directions and/or rotated to an Earth-fixed reference frame (e.g., top-of-hole or North). The gains may be matched to the reference tool gains and the reference tool gains may be cancelled by dividing the measurements by the reference tool air calibration values.

In describing the process, the $G_{Txy\_ratio}$ and $G_{Rxy\_ratio}$ matrices may be applied as described above for the non-rotating example. Applying these ratios to the measured voltage harmonics replaces the y-axis transmitter and y-axis receiver gains with the x-axis transmitter and x-axis receiver gains. The voltage measurements may then be rotated by rotating the harmonic voltage coefficients, for example, as follows:

$$V_{DC\_rot} \stackrel{def}{=} G_{Txy\_ratio}V_{DC}G_{Rxy\_ratio}R_{\gamma m}^{t} \quad \text{EQUATION 48}$$

$$V_{FHC\_rot} \stackrel{def}{=} G_{Txy\_ratio}V_{FHC}G_{Rxy\_ratio}R_{\gamma m}^{t}$$

$$V_{FHS\_rot} \stackrel{def}{=} R_{90}G_{Txy\_ratio}V_{FHS}G_{Rxy\_ratio}R_{\gamma m}^{t}R_{90}^{t}$$

$$V_{SHC\_rot} \stackrel{def}{=} G_{Txy\_ratio}V_{SHC}G_{Rxy\_ratio}R_{\gamma m}^{t}$$

$$V_{SHS\_rot} \stackrel{def}{=} R_{45}G_{Txy\_ratio}V_{SHS}G_{Rxy\_ratio}R_{\gamma m}^{t}R_{45}^{t}$$

wherein an additional 90 degree back rotation of the first harmonic sine measurements gives a quantity that is equivalent to the rotated first harmonic cosine measurement and an additional 45-degree back rotation of the second harmonic sine measurements to give a quantity that is equivalent to the second harmonic cosine.

These rotated coefficients may be expressed in tensor (matrix) form, for example, as follows:

$$V_{DC\_rot} \stackrel{m}{=} \quad \text{EQUATION 49}$$

$$\begin{bmatrix} g_{Tx}g_{Rx}\dfrac{(Z_{xx}+Z_{yy})}{2} & g_{Tx}g_{Rx}\dfrac{(Z_{xy}-Z_{yx})}{2} & 0 \\ -g_{Tx}g_{Rx}\dfrac{(Z_{xy}-Z_{yx})}{2} & g_{Tx}g_{Rx}\dfrac{(Z_{xx}+Z_{yy})}{2} & 0 \\ 0 & 0 & g_{Tz}g_{Rz}Z_{zz} \end{bmatrix}$$

$$V_{FHC\_rot} \stackrel{m}{=} \begin{bmatrix} 0 & 0 & g_{Tx}g_{Rz}Z_{xz} \\ 0 & 0 & g_{Tx}g_{Rz}Z_{yz} \\ g_{T1}g_{Rx}Z_{zx} & g_{Tz}g_{Rx}Z_{zy} & 0 \end{bmatrix}$$

$$V_{FHS\_rot} \stackrel{m}{=} \begin{bmatrix} 0 & 0 & g_{Tx}g_{Rz}Z_{xz} \\ 0 & 0 & g_{Tx}g_{Rz}Z_{yz} \\ g_{Tz}g_{Rx}Z_{zx} & g_{Tz}g_{Rx}Z_{zy} & 0 \end{bmatrix}$$

$$V_{SHC\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \\ g_{Tx}g_{Rx}\dfrac{(Z_{xy}+Z_{yx})}{2} & -g_{Tx}g_{Rx}\dfrac{(Z_{xx}-Z_{yy})}{2} & 0 \\ 0 & 0 & 0 \end{bmatrix}$$

$$V_{SHS\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \\ g_{Tx}g_{Rx}\dfrac{(Z_{xy}+Z_{yx})}{2} & -g_{Tx}g_{R1x}\dfrac{(Z_{xx}-Z_{yy})}{2} & 0 \\ 0 & 0 & 0 \end{bmatrix}$$

These quantities can be rotated from the local tool reference frame to an Earth-fixed frame if so desired, for example, as follows:

$$V_{DC\_rot\_EF} \stackrel{def}{=} R_{LE}^{t}V_{DC\_rot}R_{LE} \quad \text{EQUATION 50}$$

$$V_{FHC\_rot\_EF} \stackrel{def}{=} R_{LE}^{t}V_{FHC\_rot}R_{LE}$$

$$V_{FHS\_rot\_EF} \stackrel{def}{=} R_{LE}^{t}V_{FHS\_rot}R_{LE}$$

-continued $$V_{SHC\_rot\_EF} \stackrel{def}{=} R_{LE}^t V_{SHC\_rot} R_{LE}$$

$$V_{SHS\_rot\_EF} \stackrel{def}{=} R_{LE}^t V_{SHS\_rot} R_{LE}$$

Calibration coefficients $K_{xx}$, $K_{xz}$, $K_{zx}$, and $K_{zz}$ may be computed, for example, as described in the previous example. Each rotated voltage harmonic may then be calibrated by applying the calibration coefficients, for example, as follows:

$$V_{H\_cal} \stackrel{m}{=} \begin{bmatrix} K_{xx} \cdot V_{Hxx\_meas} & K_{xx} \cdot V_{Hxy\_meas} & K_{xz} \cdot V_{Hxz\_meas} \\ K_{xx} \cdot V_{Hyz\_meas} & K_{xx} \cdot V_{Hyy\_meas} & K_{xz} \cdot V_{Hyz\_meas} \\ K_{zx} \cdot V_{Hzx\_meas} & K_{zx} \cdot V_{Hzy\_meas} & K_{zz} \cdot V_{Hzz\_meas} \end{bmatrix} \quad \text{EQUATION 51}$$

such that the rotated and calibrated voltages can be expressed as:

$$V_{DC\_rot\_cal} \stackrel{m}{=} \begin{bmatrix} \dfrac{(Z_{xx}+Z_{yy})}{2Z_{TxRxair}} & \dfrac{(Z_{xy}-Z_{yx})}{2Z_{TxRxair}} & 0 \\ -\dfrac{(Z_{xy}-Z_{yx})}{2Z_{TxRxair}} & \dfrac{(Z_{xx}+Z_{yy})}{2Z_{TxRxair}} & 0 \\ 0 & 0 & \dfrac{Z_{zz}}{Z_{TzRzair}} \end{bmatrix} \quad \text{EQUATION 52}$$

$$V_{FHC\_rot\_cal} \stackrel{m}{=} \begin{bmatrix} 0 & 0 & \dfrac{Z_{xz}}{\sqrt{Z_{TxRxair}}\sqrt{Z_{TzRzair}}} \\ 0 & 0 & \dfrac{Z_{yz}}{\sqrt{Z_{TxRxair}}\sqrt{Z_{TzRzair}}} \\ \dfrac{Z_{zx}}{\sqrt{Z_{TxRxair}}\sqrt{Z_{TzRzair}}} & \dfrac{Z_{zy}}{\sqrt{Z_{TxRxair}}\sqrt{Z_{TzRzair}}} & 0 \end{bmatrix}$$

$$V_{FHS\_rot\_cal} \stackrel{m}{=} \begin{bmatrix} 0 & 0 & \dfrac{Z_{xz}}{\sqrt{Z_{TxRxair}}\sqrt{Z_{TzRzair}}} \\ 0 & 0 & \dfrac{Z_{yz}}{\sqrt{Z_{TxRxair}}\sqrt{Z_{TzRzair}}} \\ \dfrac{Z_{zx}}{\sqrt{Z_{TxRxair}}\sqrt{Z_{TzRzair}}} & \dfrac{Z_{zy}}{\sqrt{Z_{TxRxair}}\sqrt{Z_{TzRzair}}} & 0 \end{bmatrix}$$

$$V_{SHC\_rot\_cal} \stackrel{m}{=} \begin{bmatrix} \dfrac{(Z_{xx}-Z_{yy})}{2Z_{TxRxair}} & \dfrac{(Z_{xy}+Z_{yx})}{2Z_{TxRxair}} & 0 \\ \dfrac{(Z_{xy}+Z_{yx})}{2Z_{TxRxair}} & -\dfrac{(Z_{xx}-Z_{yy})}{2Z_{TxRxair}} & 0 \\ 0 & 0 & 0 \end{bmatrix}$$

$$V_{SHS\_rot\_cal} \stackrel{m}{=} \begin{bmatrix} \dfrac{(Z_{xx}-Z_{yy})}{2Z_{TxRxair}} & \dfrac{(Z_{xy}+Z_{yx})}{2Z_{TxRxair}} & 0 \\ \dfrac{(Z_{xy}+Z_{yx})}{2Z_{TxRxair}} & -\dfrac{(Z_{xx}-Z_{yy})}{2Z_{TxRxair}} & 0 \\ 0 & 0 & 0 \end{bmatrix}$$

As is evident in equation 52, a rotating electromagnetic logging tool including a triaxial transmitter and a triaxial receiver results in redundant data. This redundant data may be used to improve reliability accuracy of the measurements. Alternatively, a biaxial transmitter (including x- and z-axis transmitting antennas) and a triaxial receiver may be used to generate the same information, but more economically. In this case the moment matrices may be expressed as follows:

$$m_T = \begin{bmatrix} 1 & 0 & 0 \\ 0 & 0 & 0 \\ 0 & 0 & 1 \end{bmatrix}$$

$$m_R = \begin{bmatrix} 1 & 0 & 0 \\ 0 & 1 & 0 \\ 0 & 0 & 1 \end{bmatrix}$$

The rotated measured voltage harmonics can then be obtained as follows (noting that now there is no need to match the x and y transmitter channels):

$$V_{DC\_rot} \stackrel{def}{=} V_{DC} G_{Rxy\_ratio} R_{ym}^t \quad \text{EQUATION 53}$$

$$V_{FHC\_rot} \stackrel{def}{=} V_{FHC} G_{Rxy\_ratio} R_{ym}^t$$

-continued $$V_{FHS\_rot} \stackrel{def}{=} V_{FHS} G_{Rxy\_ratio} R_{ym}^t R_{90}^t \quad V_{SHC\_rot} \stackrel{def}{=} V_{SHC} G_{Rxy\_ratio} R_{ym}^t$$

$$V_{SHS\_rot} \stackrel{def}{=} V_{SHS} G_{Rxy\_ratio} R_{ym}^t$$

Using the same calibration procedure, the rotated and calibrated voltages may be expressed as:

$$V_{DC\_rot} \stackrel{m}{=}$$
EQUATION 54

$$\begin{bmatrix} g_{Tx}g_{Rx}\dfrac{(Z_{xx}+Z_{yy})}{2} & g_{Tx}g_{Rx}\dfrac{(Z_{xy}-Z_{yx})}{2} & 0 \\ 0 & 0 & 0 \\ 0 & 0 & g_{Tz}g_{Rz}Z_{zz} \end{bmatrix}$$

$$V_{FHC\_rot} \stackrel{m}{=} \begin{bmatrix} 0 & 0 & g_{Tx}g_{Rz}Z_{xz} \\ 0 & 0 & 0 \\ g_{T1}g_{Rx}Z_{zx} & g_{Tz}g_{Rx}Z_{zy} & 0 \end{bmatrix}$$

$$V_{FHS\_rot} \stackrel{m}{=} \begin{bmatrix} 0 & 0 & 0 \\ 0 & 0 & g_{Tx}g_{Rz}Z_{yz} \\ g_{Tz}g_{Rx}Z_{zx} & g_{Tz}g_{Rx}Z_{zy} & 0 \end{bmatrix}$$

$$V_{SHC\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \\ 0 & 0 & 0 \\ 0 & 0 & 0 \end{bmatrix}$$

$$V_{SHS\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \\ 0 & 0 & 0 \\ 0 & 0 & 0 \end{bmatrix}$$

Tilted Transmitter and Triaxial Receiver: Rotating

As described above in the preceding examples, the y-axis antenna gains may be matched to the x-axis antenna gains and the voltage measurements may be rotated to align the transmitter and receiver x-axis (or y-axis) directions and/or rotated to an Earth-fixed reference frame (e.g., top-of-hole or North). The gains may be matched to the reference tool gains and the reference tool gains may be cancelled by dividing the measurements by the reference tool air calibration values.

In describing the process, the $G_{Rxy\_ratio}$ matrices may be applied as described for the non-rotating and rotating examples above. Applying these ratios to the measured voltage harmonics replaces the y-axis transmitter and y-axis receiver gains by the x-axis transmitter and x-axis receiver gains. The voltage measurements may then be rotated. For the DC voltages measured between the transmitter and receiver, the measurements are back rotated by the measured alignment angle, γm, which if manufacturing variation is small, is close to the actual alignment angle α. This effectively constructs a measurement that would be obtained if T1 and R1 were aligned. For the DC voltages measured between the transmitter and receiver, the measurements are back rotated by the measured alignment angle γm which if manufacturing variation is small, is close to the actual alignment angle α. This effectively constructs a measurement that would be obtained if T1 and R1 were aligned. The rotated harmonic voltage coefficients are shown below:

$$V_{DC\_rot} \stackrel{def}{=} V_{DC} G_{Rxy\_ratio} R^t_{ym}$$
EQUATION 55

$$V_{FHC\_rot} \stackrel{def}{=} V_{FHC} G_{Rxy\_ratio} R^t_{ym}$$

$$V_{FHS\_rot} \stackrel{def}{=} V_{FHS} G_{Rxy\_ratio} R^t_{ym} R^t_{90}$$

-continued $$V_{SHC\_rot} \stackrel{def}{=} V_{SHC} G_{Rxy\_ratio} R^t_{ym}$$

$$V_{SHS\_rot} \stackrel{def}{=} V_{SHS} G_{Rxy\_ratio} R^t_{ym} R^t_{90}$$

It will be understood that a tilted transmitter may be represented mathematically as an axial antenna and a transverse antenna, each having its own gain $g_{Tz}$ and $g_{Tx}$.

These rotated coefficients may be expressed in tensor (matrix) form, for example, as follows:

$$V_{DC\_rot} \stackrel{m}{=}$$
EQUATION 56

$$\begin{bmatrix} g_{Tx}g_{Rx}\dfrac{(Z_{xx}+Z_{yy})}{2} & g_{Tx}g_{Rx}\dfrac{(Z_{xy}-Z_{yx})}{2} & g_{Tz}g_{Rz}Z_{zz} \end{bmatrix}$$

$$V_{FHC\_rot} \stackrel{m}{=} \begin{bmatrix} g_{Tx}g_{Rx}Z_{zx} & g_{Tx}g_{Rx}Z_{zy} & g_{Tz}g_{Rz}Z_{zz} \end{bmatrix}$$

$$V_{FHS\_rot} \stackrel{m}{=} \begin{bmatrix} g_{Tx}g_{Rx}Z_{zx} & g_{Tx}g_{Rx}Z_{zy} & g_{Tz}g_{Rz}Z_{zz} \end{bmatrix}$$

$$V_{SHC\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \end{bmatrix}$$

$$V_{SHS\_rot} \stackrel{m}{=} \begin{bmatrix} g_{Tx}g_{Rx}\dfrac{(Z_{xx}-Z_{yy})}{2} & g_{Tx}g_{Rx}\dfrac{(Z_{xy}+Z_{yx})}{2} & 0 \end{bmatrix}$$

After rotation, the measurements are multiplied by calibration coefficients to remove all gains. Calibration coefficients $K_{xx}$, $K_{xz}$, $K_{zx}$, and $K_{zz}$ may be computed, for example, as described in the previous examples. The calibration coefficients are listed below for this example:

$$K_{xx} \stackrel{def}{=} C_{xxair} C_{Txloop} C_{Rxloop} \left[ \dfrac{1}{(1+f_{Tx}(T_{meas}))} \right]$$
EQUATION 57

$$\left[ \dfrac{1}{(1+f_{Rx}(T_{meas}))} \right] \cdot \left[ \dfrac{g e_{T\_meas} R n}{I_{T\_meas}} \right] \left[ \dfrac{1}{g e_{Rx\_meas}} \right]$$

$$K_{xx} \stackrel{m}{=} \left[ \dfrac{1}{Z_{TRxair}} \right] \left[ \dfrac{1}{g m_{Rx} g e_{Rx}} \right] \left[ \dfrac{1}{g m_{Tx} I_T} \right] = \left[ \dfrac{1}{Z_{Trxair}} \right] \left[ \dfrac{1}{g_{Rx} g_{Tx}} \right]$$

$$K_{zz} \stackrel{def}{=}$$
EQUATION 58

$$C_{zzair} C_{Tzloop} C_{Rzloop} \left[ \dfrac{1}{(1+f_{Tz}(T_{meas}))} \right] \left[ \dfrac{1}{(1+f_{Rz}(T_{meas}))} \right]$$

$$\left[ \dfrac{g e_{T\_meas} R n}{I_{T\_meas}} \right] \left[ \dfrac{1}{g e_{Rz\_meas}} \right]$$

$$K_{zz} \stackrel{m}{=} \left[ \dfrac{1}{Z_{TRzair}} \right] \left[ \dfrac{1}{g m_{Rz} g e_{Rz}} \right] \left[ \dfrac{1}{g m_{Tz} I_T} \right] = \left[ \dfrac{1}{Z_{TRzair}} \right] \left[ \dfrac{1}{g_{Rz} g_{Tz}} \right]$$

$$K_{xz} \stackrel{def}{=} \sqrt{C_{xxair} C_{zzair}}$$
EQUATION 59

$$\sqrt{\left[ \dfrac{C_{Tzloop\_ref}}{C_{Txloop\_ref}} \right] \left[ \dfrac{C_{Rxloop\_ref}}{C_{Rzloop\_ref}} \right]} \cdot \left[ \dfrac{C_{Txloop}}{(1+f_{Tx}(T_{meas}))} \right]$$

$$\left[ \dfrac{C_{Rzloop}}{(1+f_{Rz}(T_{meas}))} \right] \left[ \dfrac{g e_{T\_meas} R n}{I_{T\_meas}} \right] \left[ \dfrac{1}{g e_{Rz\_meas}} \right]$$

$$K_{xz} \stackrel{m}{=} \left[ \dfrac{1}{\sqrt{Z_{TRxair}} \sqrt{Z_{TRzair}}} \right] \left[ \dfrac{1}{g m_{Tx} I_T} \right]$$

$$\left[ \dfrac{1}{g m_{Rz} g e_{Rz}} \right] = \left[ \left[ \dfrac{1}{\sqrt{Z_{TRxair}} \sqrt{Z_{TRzair}}} \right] \right]$$

$$\left[ \dfrac{1}{g_{Tx} g_{Rz}} \right] \left[ \sqrt{\dfrac{Z_{LxRx}}{Z_{LxT}}} \sqrt{\dfrac{Z_{LzRz}}{Z_{LzT}}} \right]$$

$$K_{zx} \stackrel{def}{=} \sqrt{C_{xxair}C_{zzair}} \quad \text{EQUATION 60}$$

$$\sqrt{\left[\frac{C_{Tzloop\_ref}}{C_{Txloop\_ref}}\right]\left[\frac{C_{Rxloop\_ref}}{C_{Rzloop\_ref}}\right]} \cdot \left[\frac{C_{Txloop}}{(1+f_{Tz}(T_{meas}))}\right]$$

$$\left[\frac{C_{Rxloop}}{(1+f_{Rx}(T_{meas}))}\right]\left[\frac{ge_{T\_meas}R_n}{I_{T\_meas}}\right]\left[\frac{1}{ge_{Rx\_meas}}\right]$$

$$K_{zx} \stackrel{m}{=} \left[\frac{1}{\sqrt{Z_{TRxair}}\sqrt{Z_{TRzair}}}\right]\left[\frac{1}{gm_{Tx}I_T}\right]$$

$$\left[\frac{1}{gm_{Rx}ge_{Rx}}\right] = \left[\left[\frac{1}{\sqrt{Z_{TRxair}}\sqrt{Z_{TRzair}}}\right]\right]\left[\frac{1}{g_{Tz}g_{Rx}}\right]$$

Each rotated voltage harmonic may then be calibrated by applying the calibration coefficients, for example, as follows:

$$V_{H\_cal} \stackrel{m}{=} \begin{bmatrix} K_{xx} \cdot V_{Hxx\_meas} & K_{xx} \cdot V_{Hxy\_meas} & K_{xz} \cdot V_{Hxz\_meas} \\ K_{xx} \cdot V_{Hyx\_meas} & K_{xx} \cdot V_{Hyy\_meas} & K_{xz} \cdot V_{Hyz\_meas} \\ K_{xz} \cdot V_{Hzx\_meas} & K_{zx} \cdot V_{Hzy\_meas} & K_{zz} \cdot V_{Hzz\_meas} \end{bmatrix}$$

such that the rotated and calibrated voltages can be expressed as:

$$V_{DC\_cal} \stackrel{m}{=} \left[\frac{(Z_{xx}+Z_{yy})}{2Z_{TRxair}} \quad \frac{(Z_{xy}-Z_{yx})}{2Z_{TRxair}} \quad \frac{Z_{zz}}{Z_{TRzair}}\right] \quad \text{EQUATION 61}$$

$$V_{FHC\_cal} \stackrel{m}{=}$$

$$\left[\frac{Z_{zx}}{\sqrt{Z_{TRxair}}\sqrt{Z_{TRzair}}} \quad \frac{Z_{zy}}{\sqrt{Z_{TRxair}}\sqrt{Z_{TRzair}}} \quad \frac{Z_{xz}}{\sqrt{Z_{TRxair}}\sqrt{Z_{TRzair}}}\right]$$

$$V_{FHS\_cal} \stackrel{m}{=}$$

$$\left[\frac{Z_{zx}}{\sqrt{Z_{TRxair}}\sqrt{Z_{TRzair}}} \quad \frac{Z_{zy}}{\sqrt{Z_{TRxair}}\sqrt{Z_{TRzair}}} \quad \frac{Z_{yz}}{\sqrt{Z_{TRxair}}\sqrt{Z_{TRzair}}}\right]$$

$$V_{SHC\_cal} \stackrel{m}{=} \left[\frac{(Z_{xx}-Z_{yy})}{2Z_{TRxair}} \quad \frac{(Z_{xx}-Z_{yy})}{2Z_{TRxair}} \quad 0\right]$$

$$V_{SHS\_cal} \stackrel{m}{=} \left[\frac{(Z_{xx}-Z_{yy})}{2Z_{TRxair}} \quad \frac{(Z_{xy}+Z_{yx})}{2Z_{TRxair}} \quad 0\right]$$

It will be understood that the above description (and mathematical derivation) is for an electromagnetic tool configuration that makes use of a tilted transmitter and a triaxial receiver. It will be further understood that based on the principle of reciprocity, that the above treatment applies equally to an electromagnetic tool configuration that makes use of a triaxial transmitter and tilted receiver.

It will be still further understood that while the above examples make use of distinct x and z calibration loops, that the disclosed embodiments may also employ a tilted test loop with a known tilt angle and perform a similar or identical calibration. The disclosed embodiments are explicitly not limited to use of distinct x and z test loops.

The gain compensated electromagnetic measurements may be processed (e.g., via inversion modeling) to determine various electromagnetic and physical properties of a subterranean formation. These properties may be further evaluated to guide (steer) subsequent drilling of the wellbore, for example, during a pay-zone steering operation in which it is desirable to maintain the wellbore within a particular formation layer (i.e., the pay-zone).

It will be understood that the various steps in the disclosed calibration methodology may be implemented on a on a downhole processor (controller). By downhole processor it is meant an electronic processor (e.g., a microprocessor or digital controller) deployed in the drill string (e.g., in the electromagnetic logging tool or elsewhere in the BHA). In such embodiments, the above described calibration coefficients and calibration factors may be stored in downhole memory and may then be applied to the electromagnetic measurements by the downhole processor to compute the calibrated measurements. Such calibrated measurements may further be stored in downhole memory and/or transmitted to the surface while drilling via known telemetry techniques (e.g., mud pulse telemetry or wired drill pipe). Whether stored in memory or transmitted to the surface, the calibrated electromagnetic measurements may be utilized in an inversion process (along with a formation model) to obtain various parameters of the subterranean formation. The calibrated measurements may also be used in a geo-steering operation to guide subsequent drilling of the wellbore.

Figure 14:
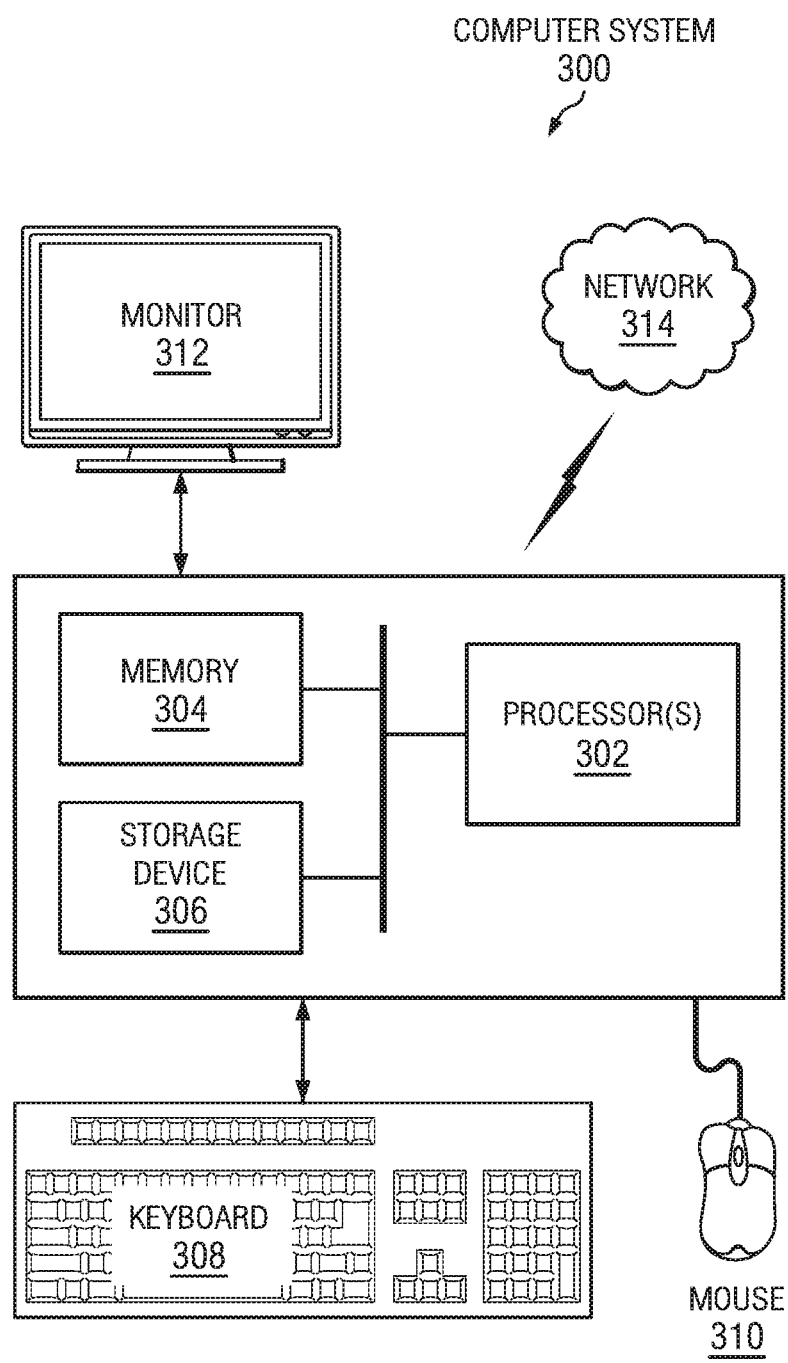
FIG. 14 depicts an example of a computer system.

Calibration of an electromagnetic logging tool (or a portion of the calibration), may be implemented on virtually any type of computer regardless of the platform being used. For example, as shown in FIG. 14, a computer system 300 includes one or more processor(s) 302, associated memory 304 (e.g., random access memory (RAM), cache memory, flash memory, etc.), a storage device 306 (e.g., a hard disk, an optical drive such as a compact disk drive or digital video disk (DVD) drive, a flash memory stick, etc.), and numerous other elements and functionalities typical of modern computers (not shown). The computer system 300 may also include input means, such as a keyboard 308, a mouse 310, or a microphone (not shown). Further, the computer system 300 may include output means, such as a monitor 312 (e.g., a liquid crystal display (LCD), a plasma display, or cathode ray tube (CRT) monitor) or printer (not shown). The computer system 300 may be connected to a network 314 (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system 300 includes at least the minimal processing, input, and/or output means necessary to practice one or more of the disclosed embodiments.

Further, those skilled in the art will appreciate that one or more elements of the aforementioned computer system 300 may be located at a remote location and connected to the other elements over a network. For example, the computer system may be coupled to a downhole processor deployed in an electromagnetic logging tool via a telemetry channel such as a mud pulse telemetry channel or wired drill pipe. Further, one or more embodiments may be implemented on a distributed system having a plurality of nodes, where each portion may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions for performing one or more embodiments of reservoir engineering may be stored on a computer readable medium such as a compact disc (CD), a diskette, a tape, or any other computer readable storage device.

The computer system may be configured to compute the various calibration factors, coefficients, and quantities described above, for example, with respect FIGS. 4-7, 10, and 12. For example, the computer system may include instructions to receive voltage and current measurements from corresponding receiving antennas, transmitting antennas, test loop antennas, and their corresponding electronics. The computer system may further include instructions to receive electromagnetic measurements from downhole tool memory (e.g., after retrieving the tool from the wellbore). The computer system may further include instructions to compute the functions that describe changes in effective area of a transmitter and/or receiver antenna with temperature and/or pressure. The computer system may further include instructions to compute calibration factors for the reference tool receiver and transmitter, for example, as recited in Equations 25 and 28, air calibration coefficients for the reference tool, for example, as recited in Equation 30, calibration coefficients for the electromagnetic logging tool receivers and transmitters, for example, as recited in Equations 32 and 33, and calibration coefficients for the electromagnetic logging measurements as recited, for example, in Equations 39, 41, 44, and 45. The computer system may include further instructions to process these calibration quantities in combination with electromagnetic measurements (e.g., received from downhole tool memory) to compute the calibrated measurements. Moreover, the calibration quantities may be processed in combination with downhole temperature and/or pressure measurements and the electromagnetic logging measurements to compute gain calibrated measurements as described above.

As also described above, the computed calibration factors, coefficients, and quantities may be stored in downhole memory and may then be applied to the electromagnetic measurements using a downhole processor (e.g., a processor deployed in the electromagnetic logging tool) to compute the calibrated measurements. For example, calibration quantities $K_{xx}$, $K_{zz}$, $K_{xz}$, and/or $K_{zx}$ may be computed using computer system 300 and stored in downhole memory. A mathematical function describing changes in effective area of a transmitter and/or receiver antenna with temperature and/or pressure may also be stored in downhole memory. In such embodiments, the downhole processor may be configured to process downhole temperature and/or pressure measurements in combination with the calibration quantities stored in memory to compute temperature and/or pressure corrected quantities. The downhole processor may be further configured to multiply selected electromagnetic logging measurements by the corrected quantities and/or by the original calibration quantities to compute the gain calibrated electromagnetic logging measurements downhole.

Although methods for gain calibrating electromagnetic measurements have been described in detail, it should be understood that various changes, substitutions and alternations can be made herein without departing from the spirit and scope of the disclosure as defined by the appended claims.

The invention claimed is:

1. A method for gain calibrating an electromagnetic measurement tool, the method comprising:
    (a) providing (i) an electromagnetic measurement tool including a transmitter and a receiver and a (ii) a reference tool including a reference transmitter and a reference receiver;
    (b) determining calibration standards for the reference tool;
    (c) measuring a first calibration factor to match the receiver on the electromagnetic measurement tool to the reference receiver on the reference tool;
    (d) measuring a second calibration factor to match the transmitter on the electromagnetic measurement tool to the reference transmitter on the reference tool;
    (e) deploying the electromagnetic measurement tool in a subterranean wellbore;
    (f) causing the electromagnetic measurement tool to make electromagnetic measurements while deployed in the subterranean wellbore; and
    (g) applying the first and second calibration factors measured in (c) and (d) and a calibration standard determined in (b) to at least one of the electromagnetic measurements made in (f) to compute a gain calibrated electromagnetic measurement.

2. The method of claim 1, wherein the electromagnetic measurement tool transmitter is deployed on a first sub and the electromagnetic measurement tool receiver is deployed on a second sub that is different from the first sub.

3. The method of claim 1, wherein the calibration standards include temperature calibration equations that relate a change in an effective turn area of the transmitter and the receiver to a measured downhole temperature.

4. The method of claim 1, wherein the calibration standards include temperature calibration equations that relate changes in effective turn areas of the transmitter and the receiver to a measured downhole temperature and a change in effective turn areas of the reference transmitter and reference receiver to a measured surface temperature.

5. The method of claim 1, wherein the calibration standards are determined in (b) via:
    (i) deploying a test loop on the reference receiver and electromagnetically coupling the test loop and the reference receiver to obtain a calibration factor for the reference receiver;
    (ii) deploying a test loop on the reference transmitter and electromagnetically coupling the test loop and the reference transmitter to obtain a calibration factor for the reference transmitter; and
    (iii) conducting an air hang test with the reference tool wherein the reference transmitter and the reference receiver are electromagnetically coupled to obtain an air calibration coefficient.

6. The method of claim 5, wherein:
    the first calibration factor is measured by deploying a test loop on the receiver, electromagnetically coupling the test loop and the receiver, and combining a voltage on either the test loop or the receiver with the calibration factor for the reference receiver; and
    the second calibration factor is measured by deploying a test loop on the transmitter, electromagnetically coupling the test loop and the transmitter, and combining a voltage on either the test loop or the transmitter with the calibration factor for the reference transmitter.

7. The method of claim 6, wherein applying the first and second calibration factors and the calibration standard in (g) comprises:
    combining the air calibration coefficient, the first calibration factor, and the second calibration factor to compute a calibration quantity for the electromagnetic measurement tool; and
    multiplying at least one of the electromagnetic measurements made in (f) by the calibration quantity to compute a gain calibrated electromagnetic measurement.

8. The method of claim 1, wherein the transmitter comprises a triaxial transmitter or a tilted transmitter and the receiver comprises a triaxial receiver.

9. The method of claim 1, wherein:
the transmitter includes a transverse transmitting antenna and an axial transmitting antenna and the receiver includes a transverse receiving antenna and an axial receiving antenna;
the first calibration factor includes a first transverse calibration factor for the transverse receiving antenna and a first axial calibration factor for the axial receiving antenna; and
the second calibration factor includes a second transverse calibration factor for the transverse transmitting antenna and a second axial calibration factor for the transmitting axial transmitting antenna.

10. The method of claim 9, wherein the reference transmitter includes a transverse reference transmitting antenna and an axial reference transmitting antenna and the reference receiver includes a transverse reference receiving antenna and an axial reference receiving antenna and wherein the calibration standards are determined in (b) via:
(i) deploying a transverse test loop on the transverse reference receiving antenna and electromagnetically coupling the transverse test loop and the transverse reference receiving antenna to obtain a calibration factor for the transverse reference receiving antenna;
(ii) deploying an axial test loop on the axial reference receiving antenna and electromagnetically coupling the axial test loop and the axial reference receiving antenna to obtain a calibration factor for the axial reference receiving antenna;
(iii) deploying a transverse test loop on the transverse reference transmitting antenna and electromagnetically coupling the transverse test loop and the transverse reference transmitting antenna to obtain a calibration factor for the transverse reference transmitting antenna;
(iv) deploying an axial test loop on the axial reference transmitting antenna and electromagnetically coupling the axial test loop and the axial reference transmitting antenna to obtain a calibration factor for the axial reference transmitting antenna; and
(v) conducting an air hang test with the reference tool wherein the transverse reference transmitting antenna and the transverse reference receiving antenna are electromagnetically coupled and wherein the axial reference transmitting antenna and the axial reference receiving antenna are electromagnetically coupled to obtain corresponding transverse and axial an air calibration coefficients.

11. The method of claim 10, wherein:
the first transverse calibration factor is measured by deploying a transverse test loop on the transverse receiving antenna, electromagnetically coupling the transverse test loop and the transverse receiving antenna; and combining a voltage on either the transverse test loop or the transverse receiving antenna with the calibration factor for the transverse reference receiving antenna;
the first axial calibration factor is measured by deploying an axial test loop on the axial receiving antenna, electromagnetically coupling the axial test loop and the axial receiving antenna; and combining a voltage on either the axial test loop or the axial receiving antenna with the calibration factor for the axial reference receiving antenna;

the first transverse calibration factor is measured by deploying a transverse test loop on the transverse transmitting antenna, electromagnetically coupling the transverse test loop and the transverse transmitting antenna; and combining a voltage on either the transverse test loop or the transverse transmitting antenna with the calibration factor for the transverse reference transmitting antenna; and
the first axial calibration factor is measured by deploying an axial test loop on the axial transmitting antenna, electromagnetically coupling the axial test loop and the axial transmitting antenna; and combining a voltage on either the axial test loop or the axial transmitting antenna with the calibration factor for the axial reference transmitting antenna.

12. The method of claim 11, wherein applying the first and second calibration factors in (g) comprises:
combining the transverse air calibration coefficient, the first transverse calibration factor, and the second transverse calibration factor to compute a transverse calibration quantity for the electromagnetic measurement tool;
combining the axial air calibration coefficient, the first axial calibration factor, and the second axial calibration factor to compute an axial calibration quantity for the electromagnetic measurement tool;
multiplying at least one of the electromagnetic measurements made in (f) by the transverse calibration quantity to compute a gain calibrated electromagnetic measurement; and
multiplying at least one other of the electromagnetic measurements made in (f) by the axial calibration quantity to compute another gain calibrated electromagnetic measurement.

13. A method for calibrating an electromagnetic measurement tool, the method comprising:
(a) providing (i) a deep reading electromagnetic measurement tool including a transmitter deployed on a transmitter sub and a receiver deployed on a receiver sub and (ii) a reference tool including a reference transmitter and a reference receiver;
(b) deploying a test loop on the reference receiver and electromagnetically coupling the test loop and the reference receiver to obtain a calibration factor for the reference receiver;
(c) deploying a test loop on the reference transmitter and electromagnetically coupling the test loop and the reference transmitter to obtain a calibration factor for the reference transmitter;
(d) conducting an air hang test with the reference tool wherein the reference transmitter and the reference receiver are electromagnetically coupled in a known conductivity environment to obtain an air calibration coefficient;
(e) measuring a first calibration factor to match the receiver on the electromagnetic measurement tool to the reference receiver on the reference tool by deploying a test loop on the receiver, electromagnetically coupling the test loop and the receiver, and combining a voltage on either the test loop or the receiver with the calibration factor obtained in (b);
(f) measuring a second calibration factor to match the transmitter on the electromagnetic measurement tool to the reference transmitter on the reference tool by deploying a test loop on the transmitter, electromagnetically coupling the test loop and the transmitter, and combining a voltage on either the test loop or the transmitter with the calibration factor obtained in (c);

(g) combining the air calibration coefficient obtained in (d), the first calibration factor measured in (e), and the second calibration factor measured in (f) to compute a calibration quantity for the electromagnetic measurement tool; and (h) deploying the electromagnetic measurement tool in a subterranean wellbore;

(i) causing the electromagnetic measurement tool to make electromagnetic measurements while deployed in the subterranean wellbore; and (j) multiplying at least one of the electromagnetic measurements made in (i) by the calibration quantity computed in (g) to compute a gain calibrated electromagnetic measurement.

14. The method of claim 13, wherein:

(e) and (f) further comprise measuring a surface temperature and computing temperature corrected first and second calibration factors based on the surface temperature; and (j) further comprises measuring a downhole temperature, computing a temperature corrected calibration quantity based on the downhole temperature, and multiplying the electromagnetic measurement by the temperature corrected calibration quantity.

15. The method of claim 13, wherein the transmitter includes a transverse transmitting antenna and an axial transmitting antenna, the receiver includes a transverse receiving antenna and an axial receiving antenna, the reference transmitter includes a transverse reference transmitting antenna and an axial reference transmitting antenna, and the reference receiver includes a transverse reference receiving antenna and an axial reference receiving antenna and wherein:

(g) comprises combining the air calibration coefficient, the first calibration factor, and the second calibration factor obtained using the transverse transmitting antenna, the transverse receiving antenna, the transverse reference transmitting antenna, and the transverse reference receiving antenna in (b), (c), (d), (e), and (f) to compute a transverse calibration quantity;

(g) further comprises combining the air calibration coefficient, the first calibration factor, and the second calibration factor obtained using the axial transmitting antenna, the axial receiving antenna, the axial reference transmitting antenna, and the axial reference receiving antenna in (b), (c), (d), (e), and (f) to compute an axial calibration quantity; and (j) comprises multiplying at least one of the electromagnetic measurements made in (i) by the transverse calibration quantity to compute a gain calibrated electromagnetic measurement and multiplying at least one other of the electromagnetic measurements made in (i) by the axial calibration quantity to compute another gain calibrated electromagnetic measurement.

16. One or more non-transitory computer-readable storage media comprising computer-executable instructions which upon execution by a computing device perform a method to:

determine calibration standards for a reference tool including a reference transmitter and a reference receiver;

compute a first calibration factor to match a receiver on an electromagnetic measurement tool to the reference receiver on the reference tool;

compute a second calibration factor to match a transmitter on the electromagnetic measurement tool to the reference transmitter on the reference tool; and receive electromagnetic measurements made by the electromagnetic measurement tool while deployed in a subterranean wellbore; and apply the first and second computed calibration factors and at least one of the determined calibration standards to at least one of the electromagnetic measurements to compute a gain calibrated electromagnetic measurement.

17. The one or more non-transitory computer readable storage media of claim 16, wherein the calibration standards are determined via:

computing a calibration factor for the reference receiver based upon an electromagnetic coupling between a test loop deployed on the reference receiver and the reference receiver;

computing a calibration factor for the reference transmitter based upon an electromagnetic coupling between a test loop deployed on the reference transmitter and the reference transmitter; and computing an air calibration coefficient based on an electromagnetic coupling in air between the reference transmitter and the reference receiver.

18. The one or more non-transitory computer readable storage media of claim 17, wherein the instructions to compute the first calibration factor and the second calibration factor comprise instructions to:

compute the first calibration factor by combining: (i) a voltage received from an electromagnetic coupling between a test loop and the receiver with (ii) the calibration factor for the reference receiver; and compute the second calibration factor by combining: (iii) a voltage received from an electromagnetic coupling between a test loop and the transmitter with (iv) the calibration factor for the reference transmitter.

19. The one or more non-transitory computer readable storage media of claim 18, wherein the instructions to apply the first and second computed calibration factors and at least one of the determined calibration standards comprises comprise instructions to:

combine the air calibration coefficient, the first calibration factor, and the second calibration factor to compute a calibration quantity for the electromagnetic measurement tool; and multiply the at least one electromagnetic measurement by the calibration quantity to compute the gain calibrated electromagnetic measurement.

20. The one or more non-transitory computer readable storage media of claim 19, further comprising instructions to:

receive a surface temperature measurement and compute temperature corrected first and second calibration factors based on the surface temperature measurement; and receive a downhole temperature measurement, compute a temperature corrected calibration quantity based on the downhole temperature measurement, and multiply the at least one electromagnetic measurement by the temperature corrected calibration quantity to compute the gain calibrated electromagnetic measurement.

* * * * *